United States Patent
Yoneyama et al.

(10) Patent No.: US 8,920,889 B2
(45) Date of Patent: Dec. 30, 2014

(54) OPTICAL FILM, POLARIZING PLATE, AND IMAGE-FORMING DISPLAY DEVICE

(71) Applicant: FUJIFILM Corporation, Tokyo (JP)

(72) Inventors: Hiroyuki Yoneyama, Kanagawa (JP); Yuta Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/860,908

(22) Filed: Apr. 11, 2013

(65) Prior Publication Data

US 2013/0222910 A1    Aug. 29, 2013

Related U.S. Application Data

(63) Continuation of application No. PCT/JP2011/074235, filed on Oct. 14, 2011.

(30) Foreign Application Priority Data

Oct. 14, 2010   (JP) ................................ 2010-232030

(51) Int. Cl.
    *G02B 5/30*        (2006.01)
    *G02F 1/1335*     (2006.01)
    *G02F 1/13363*    (2006.01)
    *G02B 1/04*        (2006.01)

(52) U.S. Cl.
    CPC .......... *G02B 5/3083* (2013.01); *G02F 1/13363* (2013.01); *G02B 5/3025* (2013.01); *G02B 1/04* (2013.01)
    USPC ............. 428/1.33; 349/96; 349/117; 359/507

(58) Field of Classification Search
    CPC ...... G02B 1/04; G02B 5/3025; G02B 5/3083; G02F 1/3363; G02F 1/133502; G02F 1/133504; G02F 1/133604; G02F 1/1336; G02F 1/133606; G02F 1/13363
    USPC .................... 428/1.3–1.33; 349/137, 17–121; 359/507, 601
See application file for complete search history.

(56) References Cited

U.S. PATENT DOCUMENTS

| | | | |
|---|---|---|---|
| 6,559,915 B1 * | 5/2003 | Amimori et al. | 349/112 |
| 2003/0223026 A1 * | 12/2003 | Morishima et al. | 349/117 |
| 2004/0057007 A1 | 3/2004 | Tazaki et al. | |
| 2007/0052894 A1 | 3/2007 | Tazaki et al. | |
| 2007/0091239 A1 | 4/2007 | Tazaki et al. | |
| 2007/0104896 A1 * | 5/2007 | Matsunaga et al. | 428/1.3 |

(Continued)

FOREIGN PATENT DOCUMENTS

| | | |
|---|---|---|
| JP | 2001-004837 A | 1/2001 |
| JP | 2004-053841 A | 2/2004 |

(Continued)

OTHER PUBLICATIONS

JPO Website Machine English Translation of JP 2006-091276, Daimatsu Tei, Apr. 6, 2006.*

(Continued)

*Primary Examiner* — Sophie Hon
(74) *Attorney, Agent, or Firm* — Jean C. Edwards, Esq.; Edwards Neils PLLC

(57) ABSTRACT

An optical film having: a hard coat layer; an optically anisotropic layer; and a transparent support, wherein the optically anisotropic layer contains a liquid crystalline compound and a binder, the hard coat layer, the transparent support, and the optically anisotropic layer are laminated in this order, a surface of the optically anisotropic layer contains a fluorine-containing compound not forming covalent bond with the binder of the optically anisotropic layer, a surface of the optical film on the hard coat layer-formed side contains a fluorine-containing or silicone series compound being fixed by covalent bond, and a topmost surface properties of the optical film on hard coat layer-formed side satisfies the specific conditions.

11 Claims, 2 Drawing Sheets

(56) References Cited

U.S. PATENT DOCUMENTS

2007/0231566 A1* 10/2007 Yoneyama et al. ............ 428/331
2009/0086326 A1* 4/2009 Hamamoto et al. ........... 359/601
2009/0087590 A1* 4/2009 Aiki et al. ...................... 428/1.1

FOREIGN PATENT DOCUMENTS

| JP | 2004-126534 A | 4/2004 |
|---|---|---|
| JP | 2006-091276 A | 4/2006 |
| JP | 2008-133355 A | 6/2008 |
| JP | 2008-150489 A | 7/2008 |

OTHER PUBLICATIONS

Japanese Notification of Reason for Refusal issued on Nov. 4, 2014 in connection with Japanese Patent Application No. 2011-226068.

* cited by examiner

OPTICAL FILM, POLARIZING PLATE, AND IMAGE-FORMING DISPLAY DEVICE

CROSS-REFERENCE TO RELATED APPLICATIONS

This application is a Continuation of International Application No. PCT/JP2011/074235 filed on Oct. 14, 2011, which was published under PCT Article 21(2) in Japanese, which is based upon and claims the benefit of priority from Japanese Patent Application No. 2010-232030 filed on Oct. 14, 2010, the contents both of which are incorporated herein by reference.

TECHNICAL FIELD

The present invention relates to an optical film having a cured liquid crystalline compound, a polarizing plate having the optical film, and an image-forming display device.

BACKGROUND ART

A so-called retardation film to which various functions are imparted by controlling retardation of the film has been used for various applications.

For example, retardation films have been designed for the purpose of expanding a viewing angle depending upon mode of a different kind of liquid crystal cell in a liquid crystal display. Also, beside liquid crystal display devices, λ/4 plates having retardation of ¼ wavelength are being used as brightness enhancement films, pickups for an optical disc, or PS converters.

As methods for developing such retardation, there are known a method of stretching a polymer film, a method of coating a coating liquid containing a liquid crystalline compound on a substrate and aligning in a predetermined direction to thereby develop optical anisotropy, and the like. Of them, a method of controlling retardation using a liquid crystalline compound enables one to variously control retardation by properly selecting an alignment film, a liquid crystalline compound, an alignment-controlling agent for the liquid crystalline compound, process conditions for controlling alignment, and the like, can be applied widely, and can produce the product on a large scale with high speed (JP-A-2001-4837 (the term "JP-A" as used herein means an "unexamined published Japanese patent application") and JP-A-2004-53841).

Also, as applications of the retardation plate, it has been proposed to apply it to organic electroluminescence devices, touch panels, 3D display devices, etc. with a structure wherein the plate is used at the front end position and not inside the device. However, conventional retardation plates have such problems as that they are liable to form scratches and are insufficient in strength, that they show a high reflectance when irradiated with outer light, that they have poor light fastness, and that stains are liable to deposit thereon and are difficult to remove. Thus, for use as a plate at the front end position, the plates have been required to be more improved.

In order to protect a liquid crystalline compound layer, a technique has been disclosed wherein a highly hard protective film is provided on the liquid crystalline compound layer (JP-A-2004-126534). However, it has been found that, since the liquid crystalline compound layer generally has optical anisotropy, merely providing a protective film having no optical anisotropy on the liquid crystalline compound layer causes a problem that light interference conditions so greatly differ depending upon viewing angle that rainbow-like unevenness or the like tends to occur.

SUMMARY OF THE INVENTION

In order to solve the above-described problems, the inventors have investigated optical films having a transparent support including a hard coat layer on the side on which a liquid crystalline compound layer is not coated. As a result, it has been found that, when an obtained optical film is stored in a roll state, spotty unevenness generates upon viewing the roll from outside. It has been found that the unevenness remains on the surface of the hard coat layer side after unrolling to make the optical film sheet-like, and that part of the unevenness is in some cases non-removable though partly removable with a nonwoven fabric or the like.

The inventors have found that the following means is effective for suppressing generation of unevenness after storing of the optical film in a roll form, thus having completed the invention.

The invention has been made in consideration of the above-described various problems, and its object is to provide an optical film having optically anisotropic properties, which can be prepared with high productivity without involving the problem of unevenness trouble and can be used at the front end position of a display device.

The above-described object can be attained by the following constitution.

[1] An optical film having: a hard coat layer; an optically anisotropic layer; and a transparent support, wherein the optically anisotropic layer contains a liquid crystalline compound and a binder, the hard coat layer, the transparent support, and the optically anisotropic layer are laminated in this order, a surface of the optically anisotropic layer contains a fluorine-containing compound not forming covalent bond with the binder of the optically anisotropic layer, a surface of the optical film on the hard coat layer-formed side contains a fluorine-containing or silicone series compound being fixed by covalent bond, and a topmost surface properties of the optical film on hard coat layer-formed side satisfies the following conditions:
  (1) Ra 0.05 to 0.25 μm;
  (2) Rz 0.4 to 3.0 μm;
  (3) Sm 40 to 200 μm;
  (4) surface haze 0.1 to 15;
  (5) internal haze 0 to 28; and
  (6) total haze 0.1 to 30
  wherein Ra, Rz, and Sm represent, respectively, arithmetic average roughness in roughness curve, ten point average roughness in roughness curve, and spacing between peaks in roughness curve.
[2] The optical film according to [1], wherein a surface free energy of the optically anisotropic layer (Elc) is from 21 to 30 mN/m, and a surface free energy thereof on the hard coat layer side (Ehc) is from 14 to 24 mN/m.
[3] The optical film according to [2], wherein Ehc-Elc≤0.
[4] The optical film according to any one of [1] to [3], wherein other functional layer than the hard coat layer is formed on the surface of the hard coat layer.
[5] The optical film according to any one of [1] to [4], wherein the topmost surface physical properties on the hard coat layer-formed side further satisfies the following conditions:
  (4) surface haze 0.1 to 10;
  (5) internal haze 0 to 10; and
  (6) total haze 0.1 to 15.

[6] The optical film according to any one of [1] to [5], wherein the topmost surface physical properties on the hard coat layer-formed side further satisfies the following conditions:
(4) surface haze 0.1 to 8;
(5) internal haze 0 to 5; and
(6) total haze 0.1 to 10.
[7] The optical film according to any one of [1] to [6], wherein the hard coat layer contains a binder and light-transmitting particles, a size of the light-transmitting particles is from 1 to 12 μm, and an absolute value of difference in refractive index between the binder and the light-transmitting particles is less than 0.05.
[8] The optical film according to any one of [1] to [7], wherein the hard coat layer contains a binder and light-transmitting particles, a size of the light-transmitting particles being from 3 to 12 μm, and an absolute value of the difference in refractive index between the binder and the light-transmitting particles is from 0.001 to 0.02.
[9] The optical film according to any one of [1] to [8], wherein the optical film is wound up in a roll form.
[10] The optical film according to any one of [1] to [9], wherein in-plane retardation Re of the optical film at 550 nm is from 80 to 200 nm, and Nz value of the optical film represented by the following formula is from 0.1 to 0.9:

$Nz$ value$=0.5+Rth/Re$ wherein Rth represents retardation in thickness direction.
[11] A polarizing plate having the optical film according to any one of [1] to [10] as a protective film.
[12] An image display device having at least one of the optical films according to any one of [1] to [10].
[13] An image display device having at least one of the polarizing plates according to [11].

The optical film of the invention can provide an optical film which suppresses generation of unevenness after storage in a roll form and which has excellent physical properties. Further, the optical film of the invention can provide an optical film which can be used on the surface of an image display device with keeping adequate antiglare properties and without losing functions as an optically anisotropic film.

DESCRIPTION OF EMBODIMENTS

Exemplary embodiments for carrying out the present invention will be described in detail below, but the present invention is not limited thereto. Additionally, in this specification, when a numerical value represents a physical value or a characteristic value, the numerical range represented by "from (numerical value 1) to (numerical value 2)" means the range of "(numerical value 1) or more and (numerical value 2) or less".

Figure 1A:
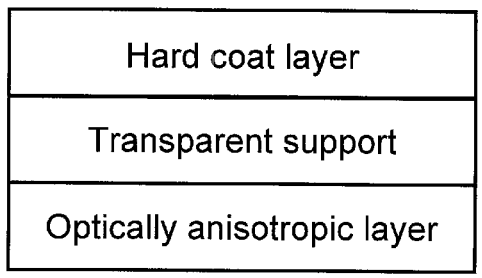
FIGS. 1A to 1C are a cross-sectional schematic view showing one example of an optical film of the invention.
Figure 1B:
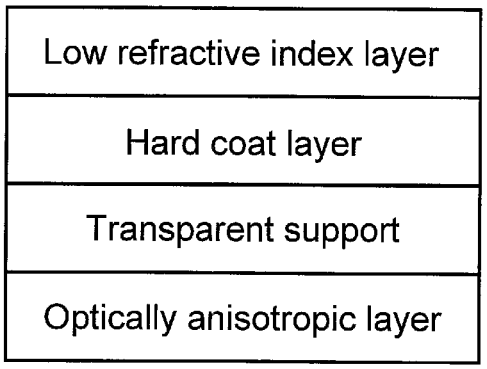
Figure 1C:
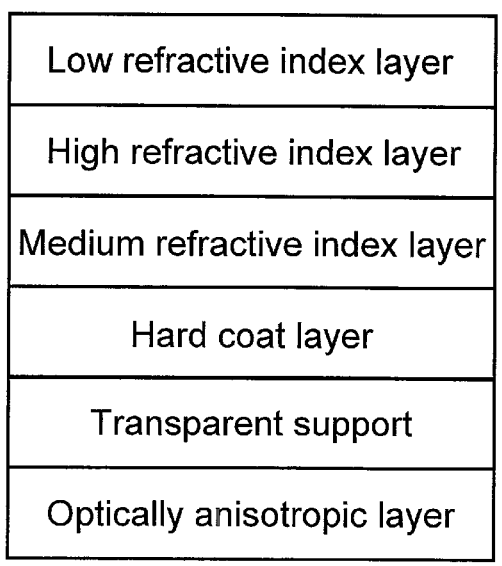
Figure 2A:
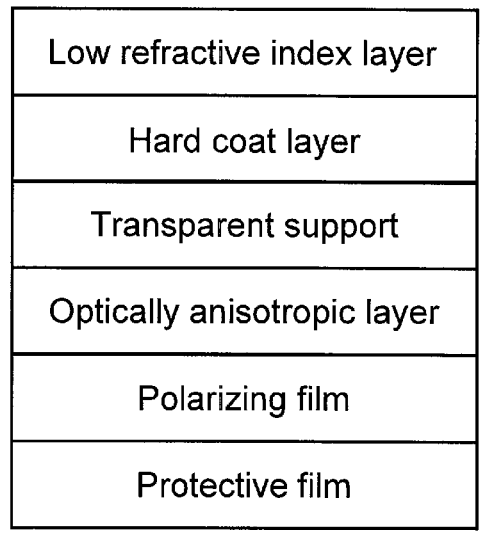
FIGS. 2A and 2B are a cross-sectional schematic view showing one example of a polarizing plate of the invention.
Figure 2B:
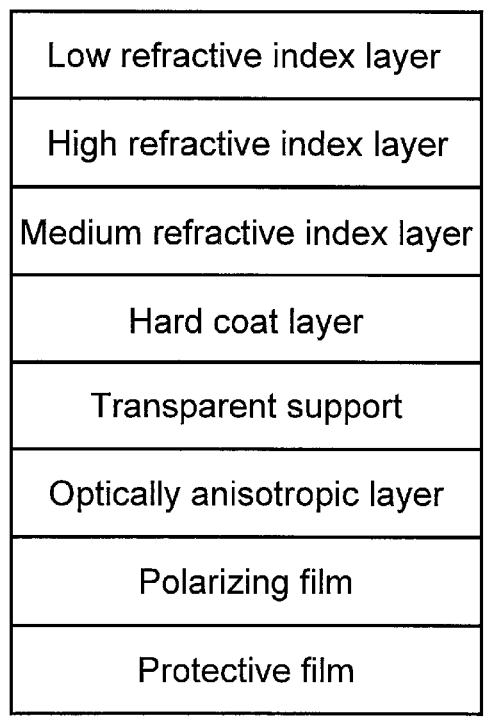

An optical film of the invention is a layered body wherein an optically anisotropic layer containing a crystalline compound layer is formed on one side of a transparent support and a hard coat layer is formed on the other side, with the hard coat layer-formed side having particular surface properties. An alignment film which functions to control alignment of the liquid crystalline compound may optionally be provided between the transparent support and the optically anisotropic layer containing liquid crystalline compound. Any other functional layers may further be provided on the hard coat layer. FIGS. 1 A to 1C are a conceptual view showing a structural example of the retardation film-layered optical film of the invention.

Although optical properties of the optical film of the invention are not particularly specified, an in-plane retardation Re at 550 nm is preferably from 5 to 300 nm, more preferably from 10 to 250 nm, most preferably from 80 to 200 nm Also, an Nz value to be defined hereinafter is preferably from 0 to 2.0, more preferably from 0.1 to 1.6, most preferably from 0.1 to 0.9 (here, Nz value=0.5+Rth/Re, with Rth being a retardation in a thickness direction; methods for measuring these optical properties being described hereinafter). In particular, with a λ/4 plate, Re and the Nz value are preferably from 80 to 200 nm and from 0.1 to 0.9, respectively, more preferably, from 100 to 150 nm and from 0.1 to 0.9, respectively.

The optical film of the present invention has high productivity because the optically anisotropic layer and the hard coat layer can be laminated by a roll to roll process.

The optical film of the invention is an optical film wherein an optically anisotropic layer containing a liquid crystalline compound is laminated on one side of a transparent support and, on the other side of the transparent support, a hard coat layer is laminated, a surface of the optically anisotropic layer contains a fluorine-containing compound not forming a covalent bond with a binder of the optically anisotropic layer, a fluorine-containing or a silicone series compound is fixed by a covalent bond to the surface of the optical film on the hard coat layer-formed side, and surface properties of the hard coat layer-formed side satisfy the following conditions:

| (1) Ra | 0.05 to 0.25 μm; |
|---|---|
| (2) Rz | 0.4 to 3.0 μm; |
| (3) Sm | 40 to 200 μm; |
| (4) surface haze | 0.1 to 15; |
| (5) internal haze | 0 to 28; and |
| (6) total haze | 0.1 to 30. |

By employing the above-described optical film constitution, there can be provided an optical film having physically excellent optical anisotropy without generating unevenness after storage of the optical film wound in a roll form. The above-described surface properties are surface properties which the hard coat layer side surface of the optical film should exhibit. The hard coat layer may be at the topmost surface, or a different layer may further be provided on the hard coat layer.

In the invention, with respect to the surface properties on the hard coat side, Ra is from 0.05 to 0.25 μm, preferably from 0.08 to 0.20 μm, still more preferably from 0.08 to 0.15 μm. Rz is from 0.4 to 3.0 μm, preferably from 0.5 to 3.0 μm, still more preferably from 0.8 to 2.5 μm, still further more preferably from 0.8 to 1.5 μm. Sm is from 40 to 200 μm, preferably from 40 to 150 μm, most preferably from 50 to 110 μm. Also, surface haze is from 0.1 to 15, preferably from 0.1 to 10, most preferably from 0.1 to 8. The internal haze is from 0 to 28, preferably from 0 to 10, most preferably from 0 to 5. The total haze is from 0.1 to 30, preferably from 0.1 to 15, most preferably from 0.1 to 10.

Here, the above-described Ra (arithmetic average roughness in roughness curve), Rz (ten point average roughness in roughness curve), and Sm (spacing between peaks in roughness curve) can be measured according to JIS B 0601:1998. Also, the haze of the film of the invention means a value prescribed in JIS-K7105, and can be measured based on the measuring method prescribed in JIS-K7361-1. The surface haze and the internal haze can be calculated based on the following measurement.

1. A total haze value (H) of the obtained film is measured according to JIS-K7136.
2. A few drops of silicone oil is added on the front surface of the film on the side of the hard coat layer of the obtained film and on the back surface thereof; the film is sandwiched by two sheets of a glass plate having a thickness of 1 mm (MICRO SLICE GLASS Product No. S9111, manufactured by MATSUNAMI) from the front and back sides, thereby bringing the film into complete intimate contact with the two glass plates; a haze is measured in a state of eliminating a surface haze; and a value obtained by subtracting a haze as separately measured by putting only silicone oil between two sheets of a glass plate therefrom is calculated as an internal haze (Hi).
3. A value obtained by subtracting the internal haze (Hi) from the total haze (H) as measured above in 2. is referred to as a surface haze (Hs).

In the invention, by controlling the physical properties of the surface of the hard coat layer in the optical film within the above-described ranges, there can be provided an optical film which has an excellent anisotropic properties excellent in physical properties without suffering generation of unevenness even after storage in a roll form. Also, the optical film can be used in an image display device without spoiling optical anisotropy.

Also, in the invention, a fluorine-containing compound or a silicone series compound must be covalently bonded to the topmost surface on the side on which the hard coat layer is formed. The topmost surface may be the hard coat layer, or a separate layer may be formed on the hard coat layer to form the topmost surface. As the separate layer to be formed on the hard coat layer to form the topmost surface of the optical film, there are illustrated, for example, an overcoat layer, a low refractive index layer, and an antifouling layer.

The surface energy (Ehc) on the hard coat layer side is preferably from 14 to 24 mN/m, more preferably from 14 to 22 mN/m, most preferably from 14 to 20 mN/m. Also, the surface free energy (Elc) of the optically anisotropic layer containing liquid crystalline compound is preferably from 21 to 30 mN/m, more preferably from 22 to 30. Also, Ehc-Elc is preferably ≤0. By controlling the surface energy within the above-described ranges, generation of unevenness can effectively be suppressed without transferring of the compounds contained in the respective surfaces when the optical film is stored in a roll form.

The optical film of the invention, polarizing plate, materials to be used in an image display device, and the methods for their production will be described in detail below.

[Hard Coat Layer]

In the invention, the term "hard coat layer" means a layer which, when formed on a transparent support, enhances pencil hardness of the transparent support. Practically, the pencil hardness (JIS K5400) after forming the hard coat layer is preferably H or more, more preferably 2H or more, most preferably 3H or more. The thickness of the hard coat layer is preferably from 0.4 to 35 µm, more preferably from 1 to 30 µm, most preferably from 1.5 to 20 µm.

The optical film of the invention is characterized in that a fluorine-containing compound or a silicone series compound is fixed by covalent bond onto the surface of the hard coat layer-formed side of the optical film, and that the surface properties on the hard coat layer-formed side satisfies the following conditions:

| (1) Ra | 0.05 to 0.25 µm; |
| (2) Rz | 0.4 to 3.0 µm; |
| (3) Sm | 40 to 200 µm; |
| (4) surface haze | 0.1 to 15; |
| (5) internal haze | 0 to 28; and |
| (6) total haze | 0.1 to 30. |

In the invention, the hard coat layer can be formed by coating, drying, and curing a composition containing a compound having an unsaturated double bond, light-transmitting particles, a polymerization initiator and, as needed, a fluorine-containing compound or a silicone series compound and a solvent on a support directly or via other layer. Respective components will be described below.

[Compound having Unsaturated Double Bond]

The composition for forming the hard coat layer of the invention can contain a compound having an unsaturated double bond. The compound containing an unsaturated double bond can function as a binder, and is preferably a poly-functional monomer having two or more polymerizable unsaturated groups. Such poly-functional monomer having two or more polymerizable unsaturated groups can function as a curing agent and can enhance coated film strength and improve anti-scratching properties. The polyfunctional monomer more preferably has 3 or more polymerizable unsaturated groups. As the monomers, a monomer having 1 or 2 functional groups and a monomer having 3 or more functional groups may be used in combination.

As the compounds having an unsaturated double bond, there are illustrated compounds having a polymerizable functional group such as a (meth)acryloyl group, a vinyl group, a styryl group, or an allyl group. Of these functional groups, a (meth)acryloyl group and —C(O)OCH=CH$_2$ are particularly preferred. Particularly preferably, the following compounds having 3 or more (meth)acryloyl groups per molecule can be used.

As specific examples of the compounds having a polymerizable unsaturated group, there can be illustrated (meth) acrylic acid diesters of alkylene glycol, (meth)acrylic acid diesters of polyoxyalkylene glycol, (meth)acrylic acid diesters of polyhydric alcohol, (meth)acrylic acid diesters of ethylene oxide or propylene oxide adduct, epoxy (meth)acrylates, urethane (meth)acrylates, and polyester (meth)acrylates.

Among them, esters between polyhydric alcohol and (meth)acrylic acid are preferred. Examples thereof include 1,4-butanediol di(meth)acrylate, 1,6-hexanediol di(meth) acrylate, neopentyl glycol (meth)acrylate, ethylene glycol di(meth)acrylate, triethylene glycol di(meth)acrylate, pentaerythritol tetra(meth)acrylate, pentaerythritol tri(meth) acrylate, trimethylolpropane tri(meth)actrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra (meth)acrylate, dipentaerythritol penta(meth)acrylate, dipentaerythritol hexa(meth)acrylate, pentaerythritol hexa(meth) acrylate, 1,2,3-cyclohexane tetramethacrylate, polyurethane polyacrylate, polyester polyacrylate, and caprolactone-modified tris(acryloxyethyl) isocyanurate.

As the polyfunctional acrylate series compounds having a (meth)acryloyl group, commercially available ones may be used. For example, there can be illustrated NK ester A-TMMT manufactured by Shin-Nakamura Chemical Co., Ltd., and KAYARAD DPHA manufactured by Nippon Kayaku. As to the polyfunctional monomers, descriptions are given in paragraphs [0114] to [0122] in JP-A-2009-98658, and the same applies to the invention.

In view of adhesion to a support, low curling properties, and fixing properties of a fluorine-containing compound or of a silicone series compound to be described hereinafter, the compounds having an unsaturated double bond are preferably compounds having a hydrogen-bonding substituent. The term "hydrogen-bonding substituent" as used herein means a substituent wherein an atom having a large electro-negativity such as nitrogen, oxygen, sulfur, or halogen and hydrogen are connected to each other through covalent bond. Specific examples thereof include OH—, SH—, —NH—, CHO—, and CHN—, with urethane (meth)acrylates and hydroxyl group-having (meth)acrylates being preferred. It is also possible to use commercially available polyfunctional acrylates having a (meth)acryloyl group. For example, there can be illustrated NK oligo U4HA and NK ester A-TMM-3 manufactured by Shin-Nakamura Chemical Co., Ltd., and KAYARAD PET-30 manufactured by Nippon Kayaku.

In order to impart sufficient polymerization ratio and sufficient hardness, the content of the compound having an unsaturated double bond in the composition for forming the hard coat layer of the invention is preferably from 70 to 99% by weight, more preferably from 80 to 99% by weight, based on the weight of all solid components in the composition for forming the hard coat layer.

[Light-Transmitting Particles]

In order to form fine unevenness on the surface of the hard coat layer of the invention, it is preferred to use the following light-transmitting particles in the hard coat layer.

As the light-transmitting particles for the hard coat layer of the invention, polymethyl methacrylate particles (refractive index: 1.49), cross-linked poly(acryl-styrene) copolymer particles (refractive index: 1.54), melamine resin particles (refractive index: 1.57), polycarbonate particles (refractive index: 1.57), polystyrene particles (refractive index: 1.60), cross-linked polystyrene particles (refractive index: 1.61), polyvinyl chloride particles (refractive index: 1.60), benzoguanamine-melamine formaldehyde particles (refractive index: 1.68), silica particles (refractive index: 1.46), alumina particles (refractive index: 1.63), zirconia particles, titania particles, and particles having hollow or fine pores are used.

Of these, cross-linked poly(meth)acrylate particles and cross-linked poly(acryl-styrene) particles are preferably used and, by appropriately adjusting the refractive index of the binder depending upon the refractive index of the particular light-transmitting particles selected from these particles, preferred surface hardness, surface haze, internal haze, and total haze for the hard coat layer in the optical film of the invention can be attained.

The refractive index of the binder to be used in the invention is preferably from 1.45 to 1.70, more preferably from 1.48 to 1.65.

Also, in the invention, difference in refractive index between the light-transmitting particles and the binder for the hard coat layer ("refractive index of the light-transmitting particles"—"refractive index of the hard coat layer excluding the light-transmitting particles") is preferably less than 0.05 in terms of the absolute value, more preferably from 0.001 to 0.030, still more preferably from 0.001 to 0.020. When difference in refractive index between the light-transmitting particles and the binder for the hard coat layer is less than 0.05, the angle of refraction by the light-transmitting particles becomes smaller, and the scattered light does not spread to a wide angle and does not exhibit detrimental influences such as scrambling of polarization of the transmitted light passed through the optically anisotropic layer, thus such difference in refractive index being preferred.

In order to realize the above-described difference in refractive index between the particles and the binder, refractive index of the light-transmitting particles may be adjusted, or refractive index of the binder may be adjusted.

As a first preferred embodiment, it is preferred to use in combination a binder containing as a major component a (meth)acrylate monomer having three or more functional groups (refractive index after curing: 1.50 to 1.53) and light-transmitting particles composed of cross-linked poly(meth) acrylate/styrene polymer having an acryl content of from 50 to 100% by weight. The difference in refractive index between the particles and the binder can easily be adjusted to less than 0.05 by adjusting composition ratio of the acryl component having a low refractive index to the styrene component having a high refractive index. The ratio of the acryl component to the styrene component is preferably from 50/50 to 100/0 by weight, more preferably from 60/40 to 100/0, most preferably from 65/35 to 90/10. The light-transmitting particles composed of the cross-linked poly(meth)acrylate/ styrene polymer have a refractive index of preferably from 1.49 to 1.55, more preferably from 1.50 to 1.54, most preferably from 1.51 to 1.53.

A second preferred embodiment is to use in combination a binder containing as a major component a (meth)acrylate monomer having three or more functional groups and inorganic fine particles of from 1 to 100 nm in average particle size. In this embodiment, refractive index of the binder having the monomer and the inorganic fine particles is adjusted so as to adjust difference in refractive index from existing light-transmitting particles. As the inorganic particles, there are illustrated particles of oxides of at least one metal selected from the group consisting of silicon, zirconium, titanium, aluminum, indium, zinc, tin, and antimony. Specific examples thereof include $SiO_2$, $ZrO_2$, $TiO_2$, $Al_2O_3$, $In_2O_3$, ZnO, $SnO_2$, $Sb_2O_3$, and ITO, with $SiO_2$, $ZrO_2$, and $Al_2O_3$ being preferred. These inorganic particles can be mixed with the monomer in a content of from 1 to 90% by weight based on the total weight of the monomer, with the content being more preferably from 5 to 65% by weight.

Here, the refractive index of the hard coat layer excluding the light-transmitting particles can be quantitatively evaluated by directly measuring with an Abbe refractometer or by measuring spectral reflectance spectrum or spectral elipsometry. Refractive index of the light-transmitting particles is measured by a method wherein the light-transmitting particles are dispersed in equal amounts in solvents prepared by changing the mixing ratio of two kinds of solvents differing in the refractive index and thereby varying the refractive index, the turbidity is measured, and the refractive index of the solvent when the turbidity becomes minimum is measured by an Abbe refractometer.

The average particle size of the light-transmitting particles is preferably from 1.0 to 12 μm, more preferably from 3.0 to 12 μm, still more preferably from 4.0 to 10.0 μm, most preferably from 4.5 to 8 μm. By adjusting the refractive index and the particle size to the above-described ranges, distribution of scattered light angles is prevented from reaching to a wide angle, and problems of blurring of a display and reduction of contrast are made difficult to occur. The thickness is preferably 12 μm or less in the point that such particles do not require a large thickness and scarcely cause the problems of curling and increase in production cost. Further, the particles of the particle size within the above-described range are preferred in the point that a coating amount upon coating can be reduced, that drying can be conducted in a short time, and that surface defects such as drying unevenness scarcely occur.

Also, regarding relation between the particle size (sphere equivalent diameter: D) of the light-transmitting particles and the thickness d of the hard coat layer, a value of D/d is preferably from 20 to 120%, particularly preferably from 30 to 80%. By adjusting the relation within this range, necessary surface unevenness profile can be obtained.

As a method for measuring the average particle size of the light-transmitting particles, any measuring method that can measure the average particle size of particles can be employed. Preferably, however, particles are observed by means of a transmission-type electron microscope (magnification: 500,000× to 2,000,000×), and 100 particles are measured, with the average value being taken as the average particle size.

In the invention, shape of the light-transmitting particles is not particularly restricted but, beside true spherical particles, light-transmitting particles having different shapes such as amorphous particles (e.g., non-spherical particles) may also be used in combination. In particular, when non-spherical particles are aligned so that the short axis thereof is uniformly directed in the normal direction of the hard coat layer, particles with a smaller particle size than that of the true spherical particles can be employed.

The light-transmitting particles are incorporated in a content of preferably from 1 to 40% by weight, more preferably from 1 to 30% by weight, still more preferably from 1 to 20% by weight. It is preferred to be incorporated in a content of 0.1% by weight or more in the point of uniformly providing projections on the surface whereas it is preferred to incorporate in a content of 40% by weight or less in the point of reducing the problems such as blurring of image or white turbidity or glaring.

Also, the coated amount of the light-transmitting particles is preferably from 10 to 2500 mg/m$^2$, more preferably from 30 to 2000 mg/m$^2$, still more preferably from 100 to 1500 mg/m$^2$.

<Preparation Process and Classification Method of Light-Transmitting Particles>

As processes for producing the light-transmitting particles in accordance with the invention, there can be illustrated a suspension polymerization process, an emulsion polymerization process, a soap-free emulsion polymerization process, a dispersion polymerization process, and a seed polymerization process, and the particles may be produced by any of these processes. With respect to these production processes, reference may be made to, for example, descriptions in *Kobunshi Gosei no Jikkenho* (written by Takayuki Otsu and Masaetsu Kinoshita and published by Kagaku Dojin-sha), p. 130 and pp. 146-147; processes described in Gosei Kobunshi, vol. 1, pp. 246-290, and vol. 3, pp. 1-108; and processes described in Japanese Patent Nos. 2,543,503, 3,508,304, 2,746,275, 3,521,560, 3,580,320, JP-A-10-1561, JP-A-7-2908, JP-A-5-297506, and JP-A-2002-145919.

Regarding the particle size distribution of the light-transmitting particles, mono-disperse particles are preferred in view of the haze value, control of diffusibility, and uniformity of coated surface properties. The CV value which represents uniformity of the particle size is preferably 15% or less, more preferably 13% or less, still more preferably 10% or less. Further, when particles having a particle size larger than the average particle size by 20% or more are specified as coarse particles, the proportion of the coarse particles is preferably 1% or less, more preferably 0.1% or less, still more preferably 0.01% or less, based on the number of total particles. As a method for obtaining particles having such particle size distribution, it is effective to conduct classification after preparation or synthesis reaction of the particles, and particles with a desired particle size distribution can be obtained by increasing the number of repeating classification or by intensifying the degree of classification.

In conducting classification, it is preferred to employ a method such as an air classification method, a centrifugal classification method, a sedimentation classification method, a filtration classification method, and an antistatic classification method.

The optical film of the invention has uneven profile on the surface on which the hard coat layer is formed, and thus light is scattered at the surface of the optical film. Also, the particles used for forming the uneven surface causes light scattering within the film. With a λ/4 plate which is used, for example, at the surface of a 3D display or an organic electroluminescence device display, it has been considered necessary to use a clear film which does not cause light scattering so as not to scramble the polarized light formed by the optically anisotropic layer. However, it has become apparent that, as long as the physical properties of the surface are within the ranges described in this specification, such film can be used without spoiling expected optical anisotropy. For avoiding spoiling of optical anisotropy, the internal haze of the optical film is preferably from 0 to 28, more preferably from 0 to 10, most preferably from 0 to 5.

[Photo-Polymerization Initiator]

Next, photo-polymerization initiators to be incorporated in the composition for forming the hard coat layer of the invention will be described.

Examples of the photo-polymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, inorganic complexes, and coumarins. Specific examples, preferred embodiments, commercially available products and the like of the photo-polymerization initiator are described in paragraphs [0133] to [0151] of JP-A-2009-098658, and the same can also be applied in the invention.

In addition, examples of various photo-polymerization initiators are also described in *Saishin UV Koka Gijutsu*, p. 159, K.K. Gijutsu Joho Kyokai (1991), and Kato Kiyomi, *Shigaisen Koka Shisutemu*, pp. 65-148, Sogo Gijutsu Senta (1989), and they are useful for the invention.

Preferred examples of the commercially available photo-radical polymerization initiator of photo-cleavage type include "Irgacure 651", "Irgacure 184", "Irgacure 819", "Irgacure 907", "Irgacure 1870" (a 7/3 mixed initiator of CGI-403/Irg184), "Irgacure 500", "Irgacure 369", "Irgacure 1173", "Irgacure 2959", "Irgacure 4265", "Irgacure 4263", "Irgacure 127", and "OXE01" produced by Ciba Specialty Chemicals Corp.; "KAYACURE DETX-S", "KAYACURE BP-100", "KAYACURE BDMK", "KAYACURE CTX", "KAYACURE BMS", "KAYACURE 2-EAQ", "KAYACURE ABQ", "KAYACURE CPTX", "KAYACURE EPD", "KAYACURE ITX", "KAYACURE QTX", "KAYACURE BTC", and "KAYACURE MCA" produced by Nippon Kayaku Co., Ltd.; "Esacure (KIP100F, KB1, EB3, BP, X33, KTO46, KT37, KIP150, TZT)" produced by Sartomer Company, Inc.; and a combination thereof.

The content of the photo-polymerization initiator in the composition for forming the hard coat layer of the invention is preferably from 0.5 to 8% by weight, more preferably from 1 to 5% by weight, based on the weight of all solid components in the composition for forming the hard coat layer for the reason that the content be enough large to sufficiently polymerize the polymerizable compound contained in the composition for forming the hard coat layer and that the content be enough small to appropriately suppress the number of initiation points.

[Solvent]

The composition for forming the hard coat layer of the invention may contain a solvent. As the solvent, various solvents can be used in consideration of solubility of the monomer, dispersibility of the light-transmitting particles, and drying properties upon coating. As such solvents, there are illustrated, for example, dibutyl ether, dimethoxyethane, diethoxyethane, propylene oxide, 1,4-dioxane, 1,3-dioxolane, 1,3,5-trioxane, tetrahydrofuran, anisole, phenetol, dimethyl carbonate, methyl ethyl carbonate, diethyl carbonate, acetone, methyl ethyl ketone (MEK), diethyl ketone, dipropyl ketone, diisobutyl ketone, cyclopentanone, cyclohexanone, methylcyclohexanone, ethyl formate, propyl formate, pentyl formate, methyl acetate, ethyl acetate, propyl acetate, methyl propionate, ethyl propionate, y-butyrolactone, methyl 2-methoxyacetate, methyl 2-ethoxyacetate, ethyl 2-ethoxyacetate, ethyl 2-ethoxypropionate, 2-methoxyethanol, 2-propoxyethanol, 2-butoxyethanol, 1,2-diacetoxyacetone, acetylacetone, diacetone alcohol, methyl acetoacetate, ethyl acetoacetate, methyl alcohol, ethyl alcohol, isopropyl alcohol, n-butyl alcohol, cyclohexyl alcohol, isobutyl acetate, methyl isobutyl ketone (MIBK), 2-octanone, 2-pentanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethylcyclohexane, benzene, toluene, xylene, etc., and these may be used independently or in combination of two or more thereof.

The solvent is preferably used in such amount that the concentration of the solid components in the composition for forming the hard coat layer of the invention falls within the range of from 20 to 80% by weight, more preferably from 30 to 75% by weight, still more preferably from 40 to 70% by weight.

[Fluorine-Containing or Silicone Series Compound]

A fluorine-containing or silicone series compound is fixed via covalent bond to the topmost surface of the optical film of the invention on the hard coat layer side. These compounds having a polymerizable unsaturated group within the molecule can be fixed by curing them together with a compound having a polymerizable unsaturated group.

The optical film of the invention may have a constitution wherein the topmost surface thereof on the hard coat layer side is the surface of the hard coat layer, but may have a different constitution wherein a separate functional layer is provided on the hard coat layer. In the case where the hard coat layer constitutes the topmost layer, it is necessary to incorporate these compounds in the hard coat layer. The fluorine-containing or silicone series compound will be described below.

In the invention, the fluorine-containing or silicone series compound is at least one compound selected from the group consisting of fluorine-containing compounds having a polymerizable unsaturated group and polysiloxane compounds of 3000 or more in weight-average molecular weight having a polymerizable unsaturated group.

[Fluorine-Containing Compounds having a Polymerizable Unsaturated Group]

Fluorine-containing compounds (hereinafter also referred to as "fluorine-containing curing agents") in the invention having a polymerizable unsaturated group are described.

The fluorine-containing curing agent of the invention is preferably a fluorine-containing compound having the structure represented by the following general formula (F):

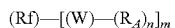   General formula (F):

In formula (F), Rf represents a (per)fluoroalkyl group or a (per)fluoropolyether group, W represents a linking group, $R_A$ represents a polymerizable unsaturated group, n represents an integer of 1 to 3, and m represents an integer of 1 to 3.

The fluorine-containing curing agents in the invention are considered to exhibit the following effects (1) to (3) due to the presence of the polymerizable unsaturated group.

(1) It is considered that, since solubility for an organic solvent and compatibility with a compound having an unsaturated double bond are enhanced, the fluorine-containing curing agent can be uniformly localized on the surface without forming aggregates. Also, generation of defects due to formation of the aggregates can be prevented.

(2) Since the fluorine-containing curing agents can form covalent bond intermolecularly or with a compound having unsaturated double bond through photo-polymerization reaction, these compounds localized on the surface do not transfer to the optically anisotropic layer side which is in contact with the surface even when the optical film is stored in a roll form.

(3) Even when the optical film is stored in a roll form, fluorine-containing compounds not forming covalent bond with the binder on the optically anisotropic layer side in contact therewith are prevented from transferring to the surface on the hard coat layer side since the surface free energy of the surface on the hard coat layer side is low.

In the general formula (F), $R_A$ represents a polymerizable unsaturated group. The polymerizable unsaturated group is not particularly restricted, and any group that can cause radical polymerization reaction upon being irradiated with active energy rays such as UV rays or electron beams may be used. Examples thereof include a (meth)acryloyl group, a (meth)acryloyloxy group, a vinyl group, and an allyl group. A (meth)acryloyl group, a (meth)acryloyloxy group, and a group formed by replacing any hydrogen atom of these groups with a fluorine atom are preferably used.

Preferred specific examples of the polymerizable unsaturated group are as follows.

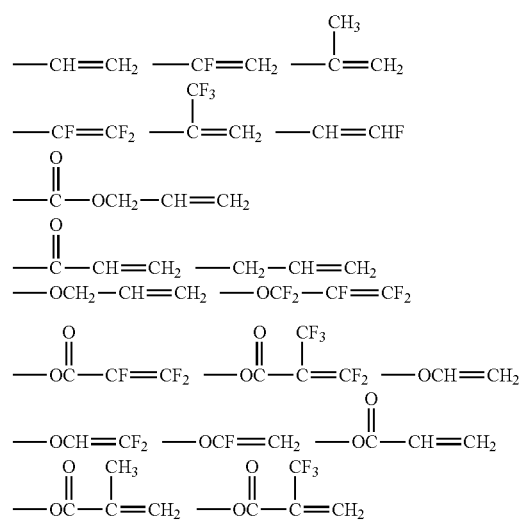

In the general formula (F), Rf represents a (per)fluoroalkyl group or a (per)fluoropolyether group.

Here, the (per)fluoroalkyl group represents at least one of a fluoroalkyl group and a perfluoroalkyl group, and the (per) fluoropolyether group represents at least one of a fluoropolyether group and a perfluoropolyether group. In view of antifouling properties, higher fluorine content in Rf is more preferred.

The (per)fluoroalkyl group contains preferably from 1 to 20 carbon atoms, more preferably from 1 to 10 carbon atoms.

The (per)fluoroalkyl group may have a straight chain structure (for example, —CF$_2$CF$_3$, —CH$_2$(CF$_2$)$_4$H, —CH$_2$(CF$_2$)$_8$CF$_3$, or —CH$_2$CH$_2$(CF$_2$)$_4$H), a branched structure (for example, CH(CF$_3$)$_2$, CH$_2$CF(CF$_3$)$_2$, CH(CH$_3$)CF$_2$CF$_3$, or CH(CH$_3$)(CF$_2$)$_5$CF$_2$H), or an alicyclic structure (preferably, a 5- or 6-membered ring, for example, a perfluorocyclohexyl group, a perfluorocyclopentyl group, or an alkyl group substituted by these groups).

(per)fluoropolyether group means a (per)fluoroalkyl group having a fluoropolyether group, and may be a mono-valent, bi-valent, or more-valent group. Examples of the fluoropolyether group include CH$_2$OCH$_2$CF$_2$CF$_3$, CH$_2$CH$_2$OCH$_2$C$_4$F$_8$H, CH$_2$CH$_2$OCH$_2$CH$_2$C$_8$F$_{17}$, CH$_2$CH$_2$OCF$_2$CF$_2$OCF$_2$CF$_2$H, and a fluorocycloalkyl group containing 4 or more fluorine atom and from 4 to 20 carbon atoms. Also, examples of the perfluoropolyether group include (CF$_2$)$_p$O(CF$_2$CF$_2$O)$_q$, [CF(CF$_3$)CF$_2$O]$_p$—[CF$_2$(CF$_3$)], (CF$_2$CF$_2$CF$_2$O)$_p$, and (CF$_2$CF$_2$O)$_p$.

The sum of p and q is preferaly from 1 to 83, more preferably from 1 to 43, most preferably from 5 to 23.

In view of excellence in transfer-preventing ability from the back side of the optical film, it is particularly preferred for the fluorine-containing curing agent of the invention to have a perfluoropolyether group represented by —(CF$_2$O)$_p$(CF$_2$CF$_2$O)$_q$—.

The above-described p and q each independently represents an integer of from 0 to 20, provided that p+q being an integer of 1 or more.

In the invention, in view of markedly obtaining the effects shown in the foregoing (1) to (3), the fluorine-containing curing agent preferably has a perfluoropolyether group and a plurality of the polymerizable unsaturated groups in one molecule.

In the general formula (F), W represents a linking group. As W, there are illustrated, for example, an alkylene group, an arylene group, a heteroalkylene group, and a linking group of a combination thereof. These linking groups may further contain an oxy group, a carbonyl group, a carbonyloxy group, a carbonylimino group, a sulfonamido group, and a functional group having a combination thereof.

W is preferably an ethylene group, more preferably an ethylene group bonded to a carbonylimino group.

The fluorine atom content of the fluorine-containing curing agent is not particularly restricted, but is preferably 20% by weight or more, particularly preferably from 30 to 70% by weight, most preferably from 40 to 70% by weight.

Examples of the preferred fluorine-containing curing agent include, but are not limited to, R-2020, M-2020, R-3833, M-3833, and Optool DAC (all trade names) manufactured by Daikin Industries, Ltd., and Megafac F-171, F-172, F-179A, and Defensa MCF-300 and MCF-323 (all trade names) manufactured by Dainippon Ink & Chemicals, Inc.

In view of markedly obtaining the effects shown in the foregoing (1) to (3), the product of n and m (n*m) is preferably 2 or more, more preferably 4 or more.

In the general formula (F), with regard to the case where n and m are 1 at the same time, in more preferred embodiments, the compounds represented by the formulae (F-1) to (F-3) may be mentioned.

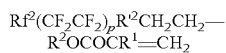
General formula (f-1)

In formula (F-1), Rf$^2$ represents either a fluorine atom or a fluoroalkyl group having from 1 to 10 carbon atoms, R'$^2$ represents a single bond or a divalent linking group, and p represents a polymerization degree, with p being k (k being an integer of 3 or more) or more.

When R'$^2$ represents a divalent linking group, examples of the divalent linking group are the same as those described with respect to foregoing W.

Examples of the telomeric acrylate containing a fluorine atom in the general formula (F-1) include partially or fully fluorinated alkyl ester derivatives of (meth)acrylic acids, and the like.

Specific examples of the compound represented by the general formula (F-1) are shown below, but the invention is not limited to these.

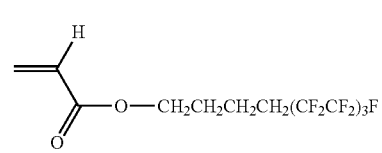
a-5

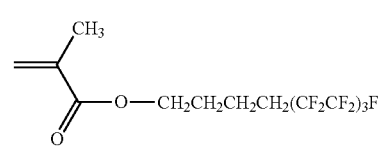
a-6

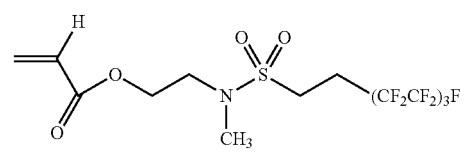
a-9

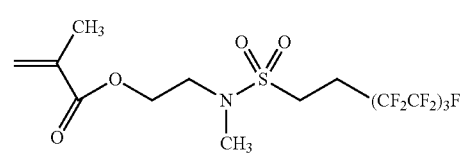
a-10

The compound represented by the general formula (F-1) may contain a plurality of fluorine-containing (meth)acrylic acid esters in which p of the group of the general formula (F-1), Rf$^2$(CF$_2$CF$_2$)$_p$CH$_2$CH$_2$—R$^2$O—, is each k, k+1, k+2, ..., or the like, according to the telomerization condition, the separation condition of a reaction mixture, and the like, in the case of using telomerization in synthesis.

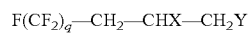
General formula (F-2)

In formula (F-2), q is an integer of from 1 to 20, and X and Y each independently is either a (meth)acryloyloxy group or a hydroxyl group, and at least one thereof is a (meth)acryloyloxy group.

The fluorine-containing (meth)acrylic acid ester represented by the general formula (F-2) has a fluoroalkyl group containing from 1 to 20 carbon atoms, having a trifluoromethyl group (CF$_3$—) at its end, and this fluorine-containing (meth)acrylic acid ester allows the trifluoromethyl group to be effectively aligned on the surface even in a small amount.

In view of preventing transfer from the back side and production easiness, q is preferably from 6 to 20, more preferably from 8 to 10. A fluorine-containing (meth)acrylic acid ester having a fluoroalkyl group containing from 8 to 10 carbon atoms exhibits excellent water- and oil-repelling properties in comparison with other fluorine-containing (meth)

acrylic acid ester having a fluoroalkyl group with different chain length, thus showing excellent antifouling properties.

Specific examples of the fluorine-containing (meth)acrylic acid ester represented by the general formula (F-2) include 1-(meth)acryloyloxy-2-hydroxy-4,4,5,5,6,6,7,7,8,8,9,9,10,10,11,11,12,12,13,13,13-heneicosafluorotridecane, 2-(meth)acryloyloxy-1-hydroxy-4,4,5,5,6,6,7,7,8,8,9,9,10,10,11,11,12,12,13,13,13-heneicosafluorotridecane, and 1,2-bis(meth)acryloyloxy-4,4,5,5,6,6,7,7,8,8,9,9,10,10,11,11,12,12,13,13,13-heneicosafluorotridecane. In the present invention, 1-acryloyloxy-2-hydroxy-4,4,5,5,6,6,7,7,8,8,9,9,10,10,11,11,12,12,13,13,13-heneicosafluorotridecane is preferred.

F(CF$_2$)$_r$O(CF$_2$CF$_2$O)$_s$CF$_2$CH$_2$OCOCR$^3$=CH$_2$    General formula (F-3)

In formula (F-3), R$^3$ is a hydrogen atom or a methyl group, s is an integer of from 1 to 20, and r represents an integer of from 1 to 4.

The fluorine atom-containing monofunctional (meth)acrylate represented by the general formula (F-3) can be obtained by reacting a fluorine atom-containing alcohol compound represented by the following general formula (FG-3) with a (meth)acrylic acid halide.

F(CF$_2$)$_r$O(CF$_2$CF$_2$O)$_s$CF$_2$CH$_2$OH    General formula (FG-3)

In formula (FG-3), s represents an integer of from 1 to 20, and r represents an integer of from 1 to 4.

Specific examples of the fluorine atom-containing alcohol compound represented by the geneal formula (FG-3) include 1H,1H-perfluoro-3,6-dioxaheptan-1-ol, 1H,1H-perfluoro-3,6-dioxaoctan-1-ol, 1H,1H-perfluoro-3,6-dioxadecan-1-ol, 1H,1H-perfluoro-3,6,9-trioxadecan-1-ol, 1H,1H-perfluoro-3,6,9-trioxaundecan-1-ol, 1H,1H-perfluoro-3,6,9-trioxatridecan-1-ol, 1H,1H-perfluoro-3,6,9,12-tetraoxatridecan-1-ol, 1H,1H-perfluoro-3,6,9,12-tetraoxatetradecan-1-ol, 1H,1H-perfluoro-3,6,9,12-tetraoxahexadecan-1-ol, 1H,1H-perfluoro-3,6,9,12,15-pentaoxahexadecan-1-ol, 1H,1H-perfluoro-3,6,9,12,15-pentaoxaheptadecan-1-ol, 1H,1H-perfluoro-3,6,9,12,15-pentaoxanonadecan-1-ol, 1H, 1H-perfluoro-3,6,9,12,15,18-hexaoxaicosan-1-ol, 1H,1H-perfluoro-3,6,9,12,15,18-hexaoxadocosan-1-ol, 1H,1H-perfluoro-3,6,9,12,15,18,21-heptaoxatricosan-1-ol, and 1H,1H-perfluoro-3,6,9,12,15,18,21-heptaoxapentacosan-1-ol.

These are commercially available, and specific examples thereof include 1H,1H-perfluoro-3,6-dioxaheptan-1-ol (trade name: C5GOL; manufactured by Exfluor), 1H,1H-perfluoro-3,6,9-trioxadecan-1-ol (trade name: C7GOL; manufactured by Exfluor), 1H,1H-perfluoro-3,6-dioxadecan-1-ol (trade name: C8GOL; manufactured by Exfluor), 1H,1H-perfluoro-3,6,9-trioxatridecan-1-ol (trade name: C10GOL; manufactured by Exfluor), and 1H,1H-perfluoro-3,6,9,12-tetraoxahexadecan-1-ol (trade name: C12GOL; manufactured by Exfluor).

In the invention, 1H,1H-perfluoro-3,6,9,12-tetraoxatridecan-1-ol is preferably used.

Also, examples of the (meth)acrylic acid halide to be reacted with the fluorine atom-containing alcohol compound represented by the foregoing general formula (FG-3) include (meth)acrylic acid fluoride, (meth)acryl acid chloride, (meth)acrylic acid bromide, and (meth)acrylic acid iodide but, from the viewpoint of easy availability, (meth)acrylic acid chloride is preferred.

Preferred specific examples of the compound represented by the general formula (F-3) include, but are not limited to, the following. Additionally, preferred specific examples represented by the general formula (F-3) are also described in JP-A-2007-264221.

F$_9$C$_4$OC$_2$F$_4$OC$_2$F$_4$OCF$_2$CH$_2$OCOCH=CH$_2$    (b-1)

F$_9$C$_4$OC$_2$F$_4$OC$_2$F$_4$OCF$_2$CH$_2$OCOC(CH$_3$)=CH$_2$    (b-2)

Furthermore, separate from the compounds represented by the general formula (F-3), compounds represented by the following general formula (F-3)' can also be preferably used.

Rf$^3$—[(O)$_c$(O=C)$_b$(CX$^4$X$^5$)$_a$—CX$^3$=CX$^1$X$^2$]    General formula (F-3)':

In formula (F-3)', each of X$^1$ and X$^2$ independently represents H or F; X$^3$ represents H, F, CH$_3$, or CF$_3$; each of X$^4$ and X$^5$ independently represents H, F, or CF$_3$; each of a, b, and c independently represents 0 or 1; Rf$^3$ represents a fluorine-containing alkyl group containing from 18 to 200 carbon atoms and having an ether bond and has, in the Rf$^3$ group, 6 or more repeating units represented by the general formula (FG-3)':

—(CX$^6_2$CF$_2$CF$_2$O)— wherein X$^6$ represents F or H.

Examples of the fluorine-containing polyether compound represented by the general formula (F-3)' include:

Rf$^3$—[(O)(O=C)$_b$—CX$^3$=CX$^1$X$^2$];    (c-1)

Rf$^3$—[(O)(O=C)—CX$^3$=CX$^1$X$^2$]; and    (c-2)

Rf$^3$—[(O)$_c$(O=C)—CF=CH$_2$].    (c-3)

As the polymerizable unsaturated group in the above-described fluorine-containing polyether compound, those which have the following structure can preferably be used. Definitions of signs in (c-1) to (c-3) are the same as with the general formula (F-3)'.

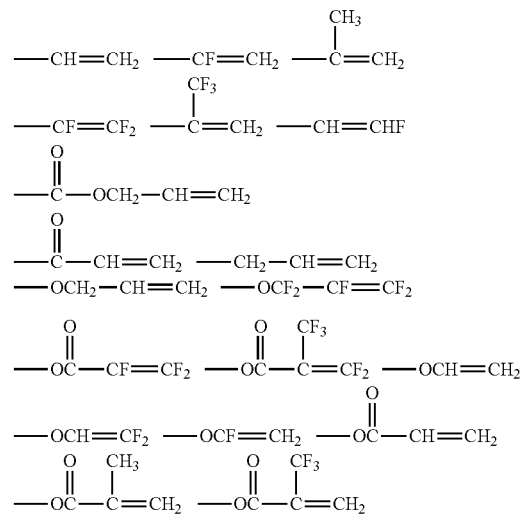

Also, the fluorine-containing polyether compound represented by the general formula (F-3)' may have a plurality of polymerizable unsaturated groups, and structures of, for example, the following are preferably exemplified.

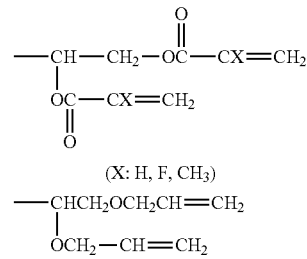

In the invention, those which have a structure of —O(C=O)CF=CH$_2$ are preferred in the point that they have particularly high polymerization (curing) reactivity and can provide a cured product with high efficiency.

As to the $Rf^3$ group in the fluorine-containing polyether compound represented by the general formula (F-3)', it is important that $Rf^3$ group contains 6 or more repeating units of the fluorine-containing polyether chain of the general formula (FG-3)', whereby a transfer-preventing properties from back side can be imparted.

Also, more specifically, a mixture containing 6 or more repeating units of the fluorine-containing polyether chain may be used but, in the case of using in the form of a mixture, a mixture is preferred in which, in the distribution of the fluorine-containing unsaturated compound having less than 6 repeating units and a fluorine-containing unsaturated compound having 6 or more repeating units, the presence ratio of the fluorine-containing unsaturated compound having 6 or more repeating units of the polyether chain is highest.

The number of repeating units of fluorine-containing polyether chain of the formula (FG-3)' is preferably 6 or more, more preferably 10 or more, still more preferably 18 or more, particularly preferably 20 or more, whereby water repellency as well as an antifouling property, particularly a property of removing stains including oil components can be improved. Also, a gas permeation property can be more effectively imparted. Further, the fluorine-containing polyether chain may be present at the end of the $Rf^3$ group or in the middle of chain.

Specifically, the $Rf^3$ group preferably has a structure of the general formula (c-4):

In formula (c-4), $X^6$ is the same as in the general formula (FG-3)', $R^4$ is at least one selected from the group consisting of a hydrogen atom, a halogen atom, an alkyl group, a fluorine-containing alkyl group, an alkyl group containing an ether bond, and a fluorine-containing alkyl group containing an ether bond, $R^5$ is a divalent or greater organic group, t is an integer of from 6 to 66, and e is 0 or 1.

That is, the $Rf^3$ group is a fluorine-containing organic group bound to a reactive carbon-carbon double bond via a divalent or greater organic group $R^5$ and has $R^4$ at the end.

$R^5$ may be any organic group that is capable of allowing the fluorine-containing polyether chain of the general formula (FG-3)' to bond to the reactive carbon-carbon double bond and, for example, it is selected from the group consisting of an alkylene group, a fluorine-containing alkylene group, an alkylene group containing an ether bond, and a fluorine-containing alkylene group containing an ether bond. Among these, a fluorine-containing alkylene group and a fluorine-containing alkylene group containing an ether bond are preferred from the viewpoint of transparency and low refractive index property.

As specific examples of the fluorine-containing polyether compound represented by the general formula (F-3)', the compounds mentioned in Republication Patent WO2003/022906 are preferably used. In the invention, $CH_2=CF-COO-CH_2CF_2CF_2-(OCF_2CF_2CF_2)_7-OC_3F_7$ can be particularly preferably used.

In the formula (F), in the case where n and m are not 1 at the same time, specific examples of the preferred embodiments include (F-4) and (F-5) below.

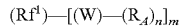  General formula (f-4):

In the general formula (F-4), $Rf^1$ represents a (per)fluoroalkyl group or a (per)fluoropolyether group, W represents a linking group, and $R_A$ represents a functional group having an unsaturated double bond. n represents an integer of from 1 to 3, m represents an integer of from 1 to 3, and n and m are not 1 at the same time.

From the viewpoints of its excellent water/oil repellency with excellent stability (antifouling durability), it is preferred that n represents 2 to 3 and m represents 1 to 3. It is more preferred that n represents 2 or 3 and m represents 2 or 3. It is most preferred that n represents 3 and m represents 2 or 3.

As $Rf^1$, monovalent to trivalent ones can be used. In the case where $Rf^1$ is monovalent, the terminal group is preferably $(C_nF_{2n+1})-$, $(C_nF_{2n+1}O)-$, $(XC_nF_{2n+1})-$, or $(XC_nF_{2n+1})-$ (wherein X is hydrogen, chlorine, or bromine, and n is an integer of from 1 to 10). Specifically, $CF_3O(C_2F_4O)_pCF_2-$, $C_3F_7O(CF_2CF_2CF_2O)_pCF_2CF_2-$, $C_3F_7O(CF(CF_3)CF_2O)_pCF(CF_3)-$, $F(CF(CF_3)CF_2O)_pCF(CF_3)-$, or the like can be preferably used.

Here, the average value of p is from 0 to 50, preferably from 3 to 30, more preferably from 3 to 20, most preferably from 4 to 15.

In the case where $Rf^1$ is divalent, $-(CF_2O)_q(C_2F_4O)_rCF_2-$, $-(CF_2)_3O(C_4F_8O)_r(CF_2)_3-$, $-CF_2O(C_2F_4O)_rCF_2-$, $-C_2F_4O(C_3F_6O)_rC_2F_4-$, $-CF(CF_3)(OCF_2CF(CF_3))_sOC_rF_{2r}O(CF(CF_3)-CF_2O)_rCF(CF_3)-$, or the like can be preferably used.

Here, the average values of q, r, and s in the formulae are from 0 to 50. Preferably, they are from 3 to 30, more preferably from 3 to 20, most preferably from 4 to 15. t is an integer of from 2 to 6.

Specific preferred examples and synthesis methods for the compounds represented by the general formula (F-4) are described in WO 2005/113690.

Hereinbelow, a case where the average value of p in $F(CF(CF_3)CF_2O)_pCF(CF_3)-$ is from 6 to 7 is denoted as "HFPO—" and a case where the average value of p in $-(CF(CF_3)CF_2O)_pCF(CF_3)-$ is from 6 to 7 is denoted as "—HFPO—", representing specific compounds of the general formula "(F-4)", though not being limited thereto.

  (d-1):

  (d-2):

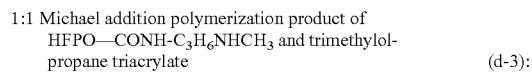  (d-3):

  (d-4);

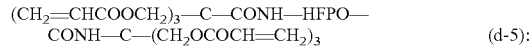  (d-5):

Furthermore, compounds represented by the general formula (F-5) may be used as the compounds represented by the general formula (F-4). General formula (F-5):

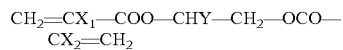

In formula (F-5), each of $X_1$ and $X_2$ represents a hydrogen atom or a methyl group, and Y represents a fluoroalkyl group containing from 2 to 20 carbon atoms and containing 3 or more fluorine atoms, or a fluorocycloalkyl group containing from 4 to 20 carbon atoms and containing 4 or more fluorine atoms.

In the present invention, the compound in which the polymerizable unsaturated group is a (meth)acryloyloxy group may have a plurality of (meth)acryloyloxy groups. By allowing the fluorine-containing curing agent to have a plurality of (meth)acryloyloxy groups, it forms a three dimensional network structure when cured, and has a high glass transition temperature and low transfer property of the curing agent, and its durability for repeated wiping to remove stains can be improved. Further, a cured coating film having excellent heat resistance, weather resistance, and the like can be obtained.

Specific preferred examples of the compound represented by the general formula (F-5) include di(meth)acrylic acid-2,2,2-trifluoroethyl ethylene glycol, di(meth)acrylic acid-2,2,3,3,3-pentafluoropropyl ethylene glycol, di(meth)acrylic acid-2,2,3,3,4,4,4-heptafluorobutyl ethylene glycol, di(meth)acrylic acid-2,2,3,3,4,4,5,5,5-nonafluoropentyl ethylene glycol, di(meth)acrylic acid-2,2,3,3,4,4,5,5,6,6,6-undecafluorohexyl ethylene glycol, di(meth)acrylic acid-2,2,3,3,4,4,5,5,6,6,7,7,7-tridecafluoroheptyl ethylene glycol, di(meth)acrylic acid-2,2,3,3,4,4,5,5,6,6,7,7,8,8,8-pentadecafluorooctyl ethylene glycol, di(meth)acrylic acid-3,3,4,4,5,5,6,6,7,7,8,8,8-tridecafluorooctyl ethylene glycol, di(meth)acrylic acid-2,2,3,3,4,4,5,5,6,6,7,7,8,8,9,9,9-heptadecafluorononyl ethylene glycol, di(meth)acrylic acid-2,2,3,3,4,4,5,5,6,6,7,7,8,8,9,9,10,10,10-nonadecafluorodecylethylene glycol, di(meth)acrylic acid-3,3,4,4,5,5,6,6,7,7,8,8,9,9,10,10,10-heptadecafluorodecylethylene glycol, di(meth)acrylic acid-2-trifluoromethyl-3,3,3-trifluoropropyl ethylene glycol, di(meth)acrylic acid-3-trifluoromethyl-4,4,4-trifluorobutyl ethylene glycol, di(meth)acrylic acid-1-methyl-2,2,3,3,3-pentafluoropropyl ethylene glycol, and di(meth)acrylic acid-1-methyl-2,2,3,3,4,4,4-heptafluorobutyl ethylene glycol, and these can be used singly or as a mixture thereof. For preparation of such di(meth)acrylic acid esters, known methods including the methods as mentioned in JP-A-6-306326 may be employed. In the invention, diacrylic acid-2,2,3,3,4,4,5,5,6,6,7,7,8,8,9,9,9-heptadecafluorononyl ethylene glycol is preferably used.

In the invention, as the compound in which the polymerizable unsaturated group is a (meth)acryloyloxy group, a compound having a plurality of (per)fluoroalkyl group or (per)fluoropolyether groups per molecule may be employed.

The fluorine-containing curing agents to be used in the invention may be any of monomers, oligomers, and polymers.

The fluorine-containing curing agent preferably has a substituent capable of contributing to formation of bond or compatibility in the topmost layer on the hard coat layer side. Presence of a plurality of such substituents is preferred, and each substituent may be the same as or different from every other substituent. Preferred examples of the substituent include an acryloyl group, a methacryloyl group, a vinyl group, an allyl group, a cinnamoyl group, an epoxy group, an oxetanyl group, a hydroxyl group, a polyoxyalkylene group, a carboxyl group, and an amino group.

The fluorine-containing curing agent may be a polymer or oligomer with a fluorine atom-free compound.

Also, the component (a) of fluorine-containing compound having a polymerizable unsaturated group may have a silicon atom within the molecule, and may have a siloxane structure or other structure than the siloxane structure. In the case where the fluorine-containing compound having a polymerizable unsaturated group has a siloxane structure, its weight-average molecular weight is less than 15,000.

In the case where the fluorine-containing compound has a siloxane structure, the compound is preferably represented by the following general formula (F-6):

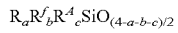   General formula (F-6):

In formula (F-6), R is a hydrogen atom, a methyl group, an ethyl group, a propyl group, or a phenyl group; $R^f$ is an organic group containing a fluorine atom; $R^A$ is an organic group containing a polymerizable unsaturated group, with 0<a, 0<b, 0<c, and a+b+c<4.

a is preferably from 1 to 1.75, more preferably from 1 to 1.5. When a is more than 1, it becomes easy to industrially synthesize the compound whereas, when a is less than 1.75, compatibility between the curability, the transfer-preventing properties from back side, and antifouling property can easily be attained.

As a polymerizable unsaturated group in $R^A$, there are illustrated the same polymerizable unsaturated groups as with $R_A$ in the foregoing general formula (F). Preferred examples thereof include a (meth)acryloyl group, a (meth)acryloyloxy group, and a group formed by replacing any hydrogen atom in these groups with a fluorine atom.

In the case where the fluorine-containing compound has a siloxane structure, examples of the siloxane structure include those wherein a substituent exists at the end and/or side chain of a compound chain containing a plurality of dimethylsilyloxy units. Other structural unit than dimethylsilyloxy unit may be contained in the compound chain containing a plurality of dimethylsilyloxy units. Each substituent may be the same as or different from every other substituent. Preferred examples of the substituent include a (meth)acryloyl group, a (meth)acryloyloxy group, a vinyl group, an allyl group, a cinnamoyl group, an epoxy group, an oxetanyl group, a hydroxyl group, a fluoroalkyl group, a polyoxyalkylene group, a carboxyl group, and an amino group. In particular, a (meth)acryloyloxy group is preferred in view of suppressing bleed-out of the fluorine-containing curing agent. Also, the number of the substituent is preferably from 1500 to 20000 g·mol$^{-1}$ in terms of weight per functional group equivalent in view of improving localizing properties of the fluorine-containing curing agent and suppression of bleed-out thereof.

$R^f$ is an organic group containing a fluorine atom, and is preferably a group represented by $C_xF_{2x+1}(CH_2)_p$— (wherein x is an integer of from 1 to 8, and p is an integer of from 2 to 10) or a perfluoropolyether-substituted alkyl group. b is preferably from 0.2 to 0.4, more preferably from 0.2 to 0.25. When b is not less than 0.2, the transfer-preventing properties from back side are improved whereas, when b is not more than 0.4, the curability is improved. $R^f$ is preferably a perfluoroalkyl group containing 8 carbon atoms.

$R^A$ is an organic group containing a (meth)acryl group and, from the viewpoint of ease of industrial synthesis, it is more preferred that its bond to a Si atom is a Si—O—C bond. c is preferably from 0.4 to 0.8, more preferably from 0.6 to 0.8. When c is not less than 0.4, the curability is improved whereas, when c is not more than 0.8, the transfer-preventing properties from back side are improved.

Further, a+b+c is preferably from 2 to 2.7, and preferably from 2 to 2.5. When a+b+c is less than 2, it becomes more difficult for the compound to be localized on the surface whereas, when a+b+c is more than 2.7, compatibility between the curability and the transfer-preventing properties from back side cannot be attained.

In the case where the fluorine-containing compound has a siloxane structure, the compound contains 3 or more F atoms and 3 or more Si atoms, preferably 3 to 17 F atoms and 3 to 8 Si atoms per molecule. If it contains not less than 3 F atoms, the antifouling property becomes sufficient whereas, when it contains not less than 3 Si atoms, the localization onto the surface is promoted and the antifouling property becomes sufficient.

In the case where the fluorine-containing compound has the siloxane structure, the compound can be prepared by a known method including the methods as mentioned in JP-A-2007-145884.

In the case where the fluorine-containing compound has the siloxane structure, the siloxane structure may have any of straight chained, branched, and cyclic structures but, among these, branched and cyclic structures are particularly preferred due to good compatibility with a compound having unsaturated double bond to be described later, which contributes to no repelling and to the easy occurrence of localization onto the surface.

Here, as a compound wherein the siloxane structure is in a branched form, those compounds are preferred which are represented by the following general formula (F-7).

$$R^fSiR_k[OSiR_m(OR^A)_{3-m}]_{3-k}$$  General formula (F-7):

In formula (F-7), R, $R^f$, and $R^A$ are the same as defined above, respectively, m=0, 1, or 2, with being preferably m=2, and k=0 or 1.

Also, as a compound wherein the siloxane structure is a cyclic structure, the compound represented by the following general formula (F-8) are preferred.

$$(R^fRSiO)(R^ARSiO)_n$$  General formula (F-8):

In formula (F-8), R, $R^f$, and $R^A$ are the same as defined above, and n≥2, with being preferably 3≤n≤5).

Specific examples of the fluorine-containing polysiloxane compound include the following compounds.

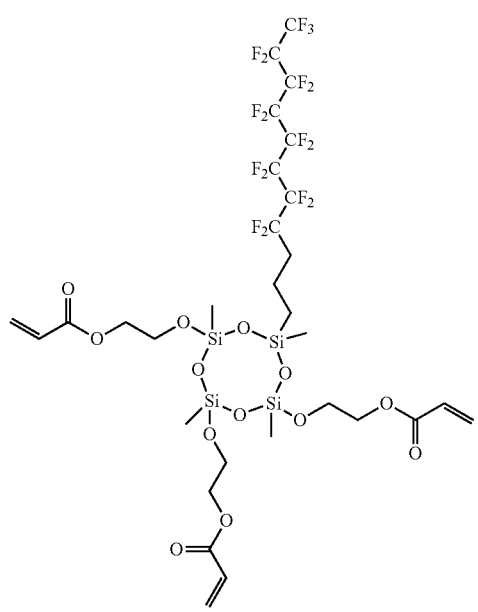

B-1

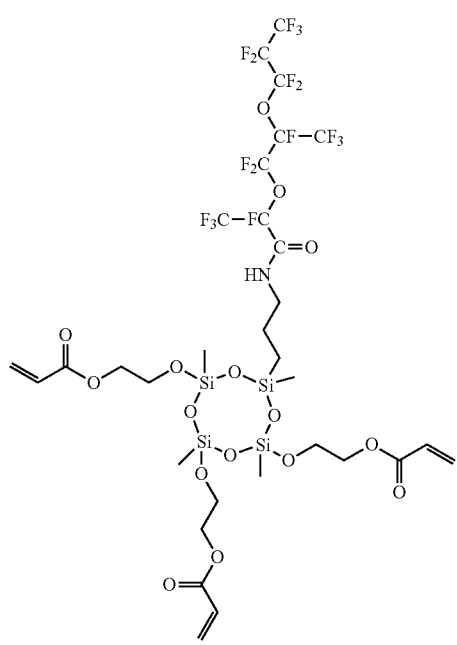

B-2

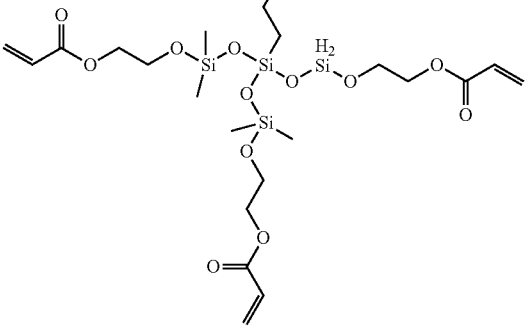

B-3

[Molecular Weight of Fluorine-Containing Curing Agent]

The weight-average molecular weight (Mw) of the fluorine-containing curing agent having a polymerizable unsaturated group can be measured by employing molecular exclusion chromatography such as gel permeation chromatography (GPC). Mw of the fluorine-containing curing agent to be used in the invention is preferably from 400 to less than 5,000, more preferably from 1,000 to less than 5,000, still more preferably from 1,000 to less than 3,500. When Mw is 400 or more, migratability of the fluorine-containing curing agent to the surface is enhanced, thus such Mw being preferred. Also, when Mw is less than 5,000, the fluorine-containing curing agent is not prevented from migrating to the surface and is easily aligned uniformly on the hard coat surface, which serves to improve transfer-preventing properties from back side and film strength, thus such Mw being preferred.

However, in the case where the fluorine-containing compound has the siloxane structure, Mw of the compound is less than 15,000, preferably from 1,000 to less than 5,000, more preferably from 1,000 to less than 3,500.

Regarding the distribution state of the fluorine-containing curing agent in the film thickness direction within the hard coat layer, it is preferred to satisfy the condition of 51%<X/Y<100% wherein X represents the fluorine amount in the vicinity of the surface of the hard coat layer, and Y represents the fluorine amount in the entire hard coat layer. When X/Y exceeds 51%, the fluorine-containing curing agent is not distributed to the inside of the film, thus such X/Y being preferred in view of scratch resistance. Additionally, "vicinity of the surface" means a region from the surface of the hard coat layer to the depth of less than 1 μm, and can be measured in terms of F-fragment ratio by a time-of-flight secondary ion mass spectrometer (TOF-SIMS).

[Addition Amount of Fluorine-Containing Curing Agent]

The addition amount of the fluorine-containing curing agent having the polymerizable unsaturated group is preferably from 1 to 20% by weight, more preferably from 1 to 15% by weight, still more preferably from 1 to 10% by weight, based on the weight of all solid components in the composition for forming the hard coat layer. When the addition amount is 1% by weight or more, the proportion of the fluorine-containing curing agent which has water-and oil-repelling properties is appropriate, and sufficient transfer-preventing properties from back side can be obtained. Also, when the addition amount is 20% by weight or less, it does not occur that the fluorine-containing curing agent unable to mix with the binder component precipitates on the surface, whitening of the film and generation of white powder on the surface are not caused, thus such amount being preferred.

Next, silicone series compounds will be described.

The silicone series compound in accordance with the invention is at least one compound selected from the group consisting of polysiloxane compounds having a polymerizable unsaturated group and having weight-average molecular weight of 3,000 or more (hereinafter also referred to as "polysiloxane curing agent"). Preferred examples of the polysiloxane curing agent include those wherein a substituent exists at the end and/or side chain of a compound chain containing a plurality of dimethylsilyloxy units. Other structural unit than dimethylsilyloxy unit may be contained in the compound chain containing a plurality of dimethylsilyloxy units. Each substituent may be the same as or different from every other substituent, and plural substituents are preferably contained. Preferred examples of the substituent include a (meth) acryloyl group, a (meth)acryloyloxy group, a vinyl group, an aryl group, a cinnamoyl group, an epoxy group, an oxetanyl group, a hydroxyl group, a fluoroalkyl group, a polyoxyalkylene group, a carboxyl group, and an amino group. In particular, a (meth)acryloyloxy group is preferred in view of suppressing bleed-out of the fluorine-containing curing agent. Also, the number of the substituent is preferably from 1500 to 20000 g·mol$^{-1}$ in terms of weight per functional group equivalent in view of improving localizing properties of the curing agent and suppression of bleed-out thereof.

The polysiloxane curing agent can be produced by using, for example, known methods described in JP-A-2007-145884.

As the additive having the polysiloxane structure, it is also preferred to add a reactive group-containing polysiloxane {for example, "KF-100T", "X-22-169AS", "KF-102", "X-22-37011E", "X-22-164C", "X-22-5002", "XC-22-173B", "X-22-174D", "X-22-167B", "X-22-161AS" (trade name; these being manufactured by Shin-Etsu Chemical Co., Ltd.), "AK-5", "AK-30", and "AK-32" (trade name; these being manufactured by Toagosei Co., Ltd.), "SILAPLANE FM0725" and "SILAPLANE FM-0721" (trade name; these being manufactured by Chisso Corp.), "DMS-U22", "RMS-033", and "UMS-182" (trade name; these being manufactured by Gelest).

The siloxane structure contained in the polysiloxane curing agent may have any of straight chained, branched, and cyclic structures but, among these, branched and cyclic structures are particularly preferred due to good compatibility with a compound having unsaturated double bond to be foregoing described, which contributes to no repelling and to the easy occurrence of localization onto the surface.

[Molecular Weight of Polysiloxane Curing Agent]

The weight-average molecular weight of the polysiloxane curing agent is 3,000 or more, preferably from 5,000 to less than 100,000, more preferably from 5,000 to 50,000. In case when the weight-average molecular weight of the polysiloxane curing agent is less than 3,000, localization of polysiloxane in the surface portion is decreased, which leads to deterioration of transfer-preventing ability and reduction of hardness, thus such molecular weight not being preferred.

The weight-average molecular weight of the polysiloxane curing agent can be measured by employing molecular exclusion chromatography such as gel permeation chromatography (GPC).

[Addition Amount of Polysiloxane Curing Agent]

The addition amount of the polysiloxane curing agent is preferably from 1 to less than 25% by weight, more preferably from 1 to less than 20% by weight, still more preferably from 1 to less than 15% by weight, most preferably from 1% by weight to less than 10% by weight, based on the weight of all solid components in the composition for forming the hard coat layer. When the addition amount is 1% by weight or more, the proportion of the polysiloxane curing agent which has water- and oil-repelling properties is appropriate, and sufficient antifouling properties can be obtained. Also, when the addition amount is 25% by weight or less, it does not occur that the polysiloxane curing agent unable to mix with the binder component precipitates on the surface, whitening of the film and generation of white powder on the surface are not caused, thus such amount being preferred.

The fluorine-containing or silicone series compound preferably dissolves in a liquid or a solvent at 20° C. As such solvent, an appropriate one can be selected according to the polarity of the compound, and examples thereof include aliphatic or aromatic alcohols, ketones, esters, and ether series solvents.

The surface free energy of the topmost surface on the hard coat layer side wherein the fluorine-containing or silicone series compound is fixed is preferably 24.0 mN/m or less, more preferably 22.0 mN/m or less, still more preferably from 14.0 mN/m to 20.0 mN/m, in terms of surface tension, in view of transfer-preventing properties from back side.

The surface free energy ($\gamma s^v$; unit: mN/m) can be determined according to the description in D. K. Owens, *J. Appl. Polym. Sci.*, 13, 1741 (1969), and can be measured according to the method described in paragraph [0297] in JP-A-10-152311.

[Layer Structure of Optical Film of the Invention]

The optical film of the invention has the hard coat layer on a transparent support and may optionally have a single layer or plural layers having necessary functions according to end uses. For example, an antireflection layer (a layer having a controlled refractive index, such as a low refractive index layer, a medium refractive index layer, and a high refractive index layer), an antiglare layer, an antistatic layer, a UV ray absorbing layer, and an antifouling layer may be provided.

More specific examples of layer structures of the optical film of the invention are shown below:

optically anisotropic layer/transparent support/hard coat layer;

optically anisotropic layer/transparent support/hard coat layer/overcoat layer;

optically anisotropic layer/transparent support/hard coat layer/low refractive index layer;

optically anisotropic layer/transparent support/hard coat layer/high refractive index layer/low refractive index layer;

optically anisotropic layer/transparent support/hard coat layer/medium refractive index layer/high refractive index layer/low refractive index layer; and optically anisotropic layer/transparent support/hard coat layer/medium refractive index layer/high refractive index layer/low refractive index layer/antifouling layer.

It is necessary for the fluorine-containing or silicone series compound to be fixed to the topmost layer of the optical film of the layer structure on the hard coat layer side through covalent bond.

As materials which can be used in these functional groups and detailed layer structure, those described in paragraphs [0018] to [0167], [0170] to [0183], and [0187] to [0243] in JP-A-2010-152311 can be employed.

Of the above-described structures, the structure wherein a low refractive index layer is provided on the topmost surface on the hard coat layer side is preferred. In the case where the low refractive index layer is the topmost layer, the low refractive index layer is preferably formed from a composition containing, as a necessary component, the aforesaid fluorine-containing or silicone series compound (a) and at least one component selected from among the fluorine-containing curable polymer (b1), the fluorine-containing or fluorine-free monomer having a polymerizable unsaturated group (b2), and inorganic particles (c). More preferably, the low refractive layer is formed from a composition containing a combination of (a), (b1), and (c), a combination of (a), (b1), (b2), and (c), or a combination of (a), (b2), and (c).

The fluorine-containing curable polymer (b1) particularly useful in the invention is a random copolymer between a perfluoroolefin and a vinyl ether or vinyl ester. It is particularly preferred for the polymer to have a group capable of independently causing cross-linking reaction (such as a radical-reactive group (e.g., a (meth)acryloyl group) and a ring-opening polymerizable group (e.g., an epoxy group or an oxetanyl group). The content of these polymerization units having a group capable of causing cross-linking reaction amounts to preferably from 5 to 70 mol %, particularly preferably from 30 to 60 mol %, based on the total polymerization units of the polymer. As preferred polymers, there can be illustrated those which are described in JP-A-2002-243907, JP-A-2002-372601, JP-A-2003-26732, JP-A-2003-222702, JP-A-2003-294911, JP-A-2003-329804, JP-A-2004-4444, and JP-A-2004-445462.

For the purpose of imparting antifouling properties scratch resistance properties to the fluorine-containing polymer of the invention, a polysiloxane structure may be introduced. Though a method of introducing a polysiloxane structure is not limited, for example, a method of introducing a polysiloxane block copolymerization component by using a silicone macro azo initiator as described in JP-A-6-93100, JP-A-11-189621, JP-A-11-228631, and JP-A-2000-313709; and a method of introducing a polysiloxane graft copolymerization component by using a silicone macromer as described in JP-A-2-251555 and JP-A-2-308806 are preferred. Examples of especially preferred compounds include polymers of Examples 1, 2 and 3 of JP-A-11-189621 and copolymers A-2 and A-3 of JP-A-2-251555. Such a polysiloxane component is contained in an amount of preferably from 0.5 to 10% by weight, particularly especially preferably from 1 to 5% by weight in the polymer.

[Inorganic Fine Particles]

In the invention, from the viewpoint of reducing the refractive index and improving the scratch resistance, the inorganic fine particles are used in the low refractive index layer. The inorganic fine particles are not particularly limited as long as they have an average particle size of from 5 to 120 nm but, from the viewpoint of reducing the refractive index, inorganic low refractive index particles are preferred.

The inorganic fine particle includes, because of low refractive index, magnesium fluoride fine particles and silica fine particles. Particularly, from the viewpoint of refractive index, dispersion stability, and production cost, silica fine particles are preferred. The size (primary particle diameter) of the inorganic particles is preferably from 5 to 120 nm, more preferably from 10 to 100 nm and from 20 to 100 nm, most preferably from 30 to 90 nm If the particle size of the inorganic fine particles is too small, the effect of improving the scratch resistance decreases whereas, if it is too large, fine irregularities are generated on the low refractive index layer surface and the appearance (for example, jet blackness) or integrated reflectivity is deteriorated. Further, in the case where hollow silica fine particles to be described later are used, if the particle size is too small, the proportion of hollow portion is reduced and sufficient reduction in refractive index cannot be achieved. The inorganic fine particles may be crystalline or amorphous, and it may be monodisperse particles or may even be aggregate particles as long as the predetermined particle size is satisfied. The shape is most preferably spherical, but it may be an indefinite form.

The coated amount of the inorganic fine particles is preferably from 1 $mg/m^2$ to 100 $mg/m^2$, more preferably from 5 $mg/m^2$ to 80 $mg/m^2$, and still more preferably from 10 mg/m to 60 $mg/m^2$. If the coated amount is too small, sufficient reduction in refractive index cannot be achieved or the effect of improving the scratch resistance decreases whereas, if it is too large, fine irregularities are generated on the low refractive index layer surface and the appearance (for example, jet blackness) or the integrated reflectivity may be deteriorated.

(Porous or Hollow Fine Particles)

In order to reduce the refractive index, fine particles having a porous or hollow structure are preferably used, and silica particles having a hollow structure are particularly preferably used. The void percentage of these particles is preferably from 10 to 80%, more preferably from 20 to 60%, most preferably from 30 to 60%. The void percentage of the hollow fine particles is preferably in the above-described range from the viewpoint of reducing the refractive index and maintaining the durability of the particles.

In the case where the porous or hollow particles are silica particles, the refractive index of the fine particles is preferably from 1.10 to 1.40, more preferably from 1.15 to 1.35, most preferably from 1.15 to 1.30. The refractive index as used herein indicates a refractive index of the particle as a whole, and does not indicate a refractive index of only silica in the outer shell forming the silica particle.

In addition, two or more kinds of hollow silica particles different in average particle size can be used in combination. The average particle size of hollow silica particles can be determined from an electron microscope.

In the invention, the specific surface area of the hollow silica is preferably from 20 to 300 $m^2/g$, more preferably from 30 to 120 $m^2/g$, most preferably from 40 to 90 $m^2/g$. The surface area can be determined by a BET method using nitrogen.

In the invention, void-free silica particles may be used in combination with the hollow silica. The particle size of the void-free silica is preferably 30 nm or more and 150 nm or less, more preferably 35 nm or more and 100 nm or less, most preferably 40 nm or more and 80 nm or less.

[Method for Surface Treatment of Inorganic Fine Particles]

Also, in the invention, the inorganic fine particle can be used after surface treatment with a silane coupling agent in a conventional method.

Particularly, in order to improve the dispersibility in the binder for the formation of a low refractive index layer, the surface of the inorganic fine particles is preferably treated with a hydrolysate of an organosilane compound and/or a partial condensate thereof, and it is still more preferred that either one or both of an acid catalyst and a metal chelate compound are used in the treatment.

The method for the surface treatment of the inorganic fine particles is described in paragraphs [0046] to [0076] in JP-A-2008-242314, and the organosilane compound, the siloxane compound, the solvent for surface treatment, the catalyst for surface treatment, the metal chelate compound, and the like as described in this document can also be suitably used in the invention.

In the low refractive index layer of the invention may be used a fluorine-containing or fluorine-free monomer (b2) having a polymerizable unsaturated group. As the fluorine-free monomer, compounds having an unsaturated double bond and having been described as compounds capable of being used in the hard coat layer are also preferable used. As the fluorine-containing monomer, it is preferred to use the fluorine-containing polyfunctional monomer (d) represented by the following general formula (1), containing fluorine in a content of 35% by weight or more, and a calculated value of all inter-crosslinking molecular weight is less than 500.

$$Rf2\{-(L)m-Y\}n \qquad \text{General formula (1):}$$

In the general formula (1), Rf2 represents a n-valent group containing at least a carbon atom and a fluorine atom, n represents an integer of 3 or more, L represents a single bond or a divalent linking group, m represents 0 or 1, and Y represents a polymerizable unsaturated group.

Rf2 may contain at least either of oxygen atom and hydrogen atom. Also, Rf2 is chained (straight-chained or branched chained) or cyclic.

Y is preferably a group containing two carbon atoms forming an unsaturated bond, more preferably a radical-polymerizable group, particularly preferably a group selected from the group consisting of a (meth)acryloyl group, an allyl group, an a-fluoroacryloyl group, and $-C(O)OCH=CH_2$. Of these, in view of polymerizable properties, a (meth)acryloyl group, an allyl group, an a-fluoroacryloyl group, and $-C(O)OCH=CH_2$, which can be radically polymerized are preferred.

L represents a divalent linking group, specifically an alkylene group containing from 1 to 10 carbon atoms, an arylene group containing from 6 to 10 carbon atoms, $-O-$, $-S-$, $-N(R)-$, a group of a combination of an alkylene group having from 1 to 10 carbon atoms and $-O-$, $-S-$ or $-N(R)-$, or a group of a combination of an arylene group having from 6 to 10 carbon atoms and $-O-$, $-S-$ or $-N(R)-$. R represents a hydrogen atom or an alkyl group containing from 1 to 5 carbon atoms. In the case where L represents an alkylene group or an arylene group, the alkylene group or the arylene group represented by L preferably has a halogen atom as a substituent, more preferably a fluorine atom.

Specific examples of the compound represented by the general formula (1) are described in paragraphs [0121] to [0163] in JP-A-2010-152311.

(Method for Coating Hard Coat Layer)

The hard coat layer for the optical film of the invention can be formed according to the following methods.

Initially, a composition for forming the hard coat layer is prepared. Then, the composition is coated on a transparent support by a dip coating method, an air-knife coating method, a curtain coating method, a roller coating method, a wire-bar coating method, a gravure coating method, a die coating method, or the like, and is heated to dry. Of these methods, a micro gravure coating method, a wire-bar coating method, and a die coating method (see, U.S. Pat. No. 2,681,294 and JP-A-2006-122889) are preferred, with a die coating method being particularly preferred.

The optical film of the invention is an optical film wherein an optically anisotropic layer containing a liquid crystalline compound is coated on one side of a transparent support, and a hard coat layer is coated on the other side thereof, with the order of coating the two layers not being particularly restricted.

After being coated on the transparent support, the hard coat layer is conveyed to a heated zone on a web for removing the solvent. The temperature in the drying zone is preferably from 25° C. to 140° C. It is preferred that the temperature in the first half of the drying zone is at a comparatively low level and that in the second half of the drying zone is at a comparatively high level. However, the temperature is preferably lower than a temperature at which other ingredients than the solvent contained in the coating composition for each layer starts to vaporize. For example, some of commercially available photo radical generators to be used in combination with a UV ray-curable resin vaporize in an amount of about 10% thereof within several minutes in a 120° C. hot air condition, and some of mono- or bi-functional acrylate monomers progressively vaporizes in a 100° C. hot water condition. In such cases, the temperature is preferably less than a temperature at which other ingredients than the solvent contained in the coating composition for forming the hard coat layer starts to vaporize, as is described hereinbefore.

Also, in order to prevent to cause drying unevenness, the drying air to be applied after coating the coating composition for the hard coat layer on a substrate film is preferably from 0.1 to 2 m/sec in air velocity on the coated film surface during the period wherein the content of solid components in the coating composition is between 1 to 50%.

Also, after coating the coating composition of the hard coat layer on the substrate film, the difference between the temperature of a convey roll in contact with the opposite side of the substrate film to the coated side thereof and the temperature of the substrate film is preferably within 0° C. to 20° C. in view of preventing drying unevenness due to non-uniform heat transmission.

After the drying zone for removing the solvent, the film is passed, on the web, through a zone where the hard coat layer is cured by irradiation with ionizing radiation to thereby cure the coated film. For example, with a UV ray-curable coated film, it is preferred to cure the coated film by irradiating with UV rays in an irradiation amount of from 10 mJ/cm² to 1,000 mJ/cm². In this occasion, the irradiation amount localization in the width direction of the web is preferably such that the irradiation amount is maximum at the center and that it distributes between 50 to 100% including both edge portions, with 80 to 100% being more preferred. Further, in the case where it is necessary to reduce oxygen density by purge with a nitrogen gas in order to accelerate surface curing, the oxygen concentration is preferably from 0.01% to 5%, and the localization thereof in the width direction is preferably 2% or less. In the case of irradiating with UV rays, UV rays emitted from light sources such as a super-high-pressure mercury lamp, a high-pressure mercury lamp, a low-pressure mercury lamp, a carbon arc, a xenon arc, a metal halide lamp, etc. can be utilized. Also, in order to accelerate the curing reaction, it is also possible to increase the temperature upon curing. Such temperature is preferably from 25 to 100° C., more preferably from 30 to 80° C., most preferably from 40 to 70° C.

The hard coat layer of the invention can be coated, dried, and cured as described above. Also, as will be described hereinafter, other functional layers can be provided as needed. In the case of providing other functional layers in addition to the hard coat layer, plural layers may be coated simultaneously or successively. Methods for producing the layers can be conducted according to the method for producing the hard coat layer. Transparent support

[Material for Transparent Support]

The material for the transparent support of the invention is preferably a polymer having excellent optical transparency, mechanical strength, thermal stability, water-impermeability, and isotropy. The term "transparent" as used herein means that percent transmission is 60% or more, preferably 80% or more, particularly preferably 90% or more. For example, polycarbonate polymer, polyester polymer such as polyethylene terephthalate and polyethylene naphthalate, acrylic polymer such as polymethyl methacrylate, and styrenic polymer such as polystyrene and acrylonitrile/styrene copolymer (AS resin) are illustrated. Other examples of the polymer for use herein are polyolefin such as polyethylene and polypropylene; polyolefinic polymer such as ethylene/propylene copolymer; vinyl chloride polymer; amide polymer such as nylon and aromatic polyamide; imide polymer; sulfone polymer; polyether sulfone polymer; polyether-ether ketone polymer; polyphenylene sulfide polymer; vinylidene chloride polymer; vinyl alcohol polymer; vinylbutyral polymer; allylate polymer; polyoxymethylene polymer; epoxy polymer; and mixture of any of the above-mentioned polymers. The high-molecular film of the invention may be formed as a cured layer of a UV-curable or thermosetting resin such as acrylic, urethane, acrylurethane, epoxy or silicone resin.

As the material for forming the transparent support of the invention, thermoplastic norbornene resin can preferably be used. The thermoplastic norbornene resin includes Zeonex and Zeonoa (manufactured by ZEON CORPORATION; and Arton (manufactured by JSR Corporation).

As the material for forming the transparent support of the invention, cellulose polymer (hereinafter referred to as cellulose acylate) such as typically triacetyl cellulose that has heretofore been used for transparent protective film for polarizing plates. As an example of the transparent support of the invention, cellulose acylate is mainly described in detail hereinafter, but it is apparent that the technical matters are similarly applicable to other high-molecular films.

[Degree of Substitution in Cellulose Acylate]

Next, cellulose acylate to be produced from the above-mentioned cellulose material will be described. The cellulose acylate of the present invention is produced by acylating the hydroxyl group in cellulose, in which the substituent acyl group may have from 2 carbon atoms (acetyl group) to 22 carbon atoms. In the cellulose acylate of the invention, the degree of substitution of the hydroxyl group in cellulose is not specifically restricted. The degree of substitution may be calculated by measuring the bonding degree of acetic acid and/or fatty acid having from 3 to 22 carbon atoms substituted for the hydroxyl group in cellulose. It may be measured according to the method of ASTM D-817-91.

As described hereinabove, the degree of substitution of the hydroxyl group in cellulose to give cellulose acylate of the invention is not particularly restricted. Preferably, however, the degree of acyl substitution of the hydroxyl group in cellulose is from 2.50 to 3.00, more preferably from 2.75 to 3.00, still more preferably from 2.85 to 3.00.

Of acetic acid and/or fatty acid having from 3 to 22 carbon atoms to be introduced in the place of a hydrogen atom of the hydroxyl group in cellulose, the acyl group having from 2 to 22 carbon atoms may be selected from aliphatic groups or aromatic groups, though not particularly restricted. One or more different types of such acids may be used for the substitution either singly or as a combination thereof. The cellulose esters prepared by acylating with these includes, for example, alkylcarbonyl esters, alkenylcarbonyl esters, aromatic carbonyl esters and aromatic alkylcarbonyl esters of cellulose, which may be further substituted. Preferred examples of the acyl group are acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl, and cinnamoyl groups. Of those, more preferred are acetyl, propionyl, butanoyl, dodecanoyl, octadecanoyl, t-butanoyl, oleoyl, benzoyl, naphthylcarbonyl, and cinnamoyl; and still more preferred are acetyl, propionyl, and butanoyl.

[Degree of Polymerization of Cellulose Acylate]

The degree of polymerization of the cellulose acylate preferably used in the invention is from 180 to 700 in terms of the viscosity-average degree of polymerization thereof. With cellulose acetate, the viscosity-average degree of polymerization is more preferably from 180 to 550, still more preferably from 180 to 400, particularly preferably from 180 to 350.

[Additive to Cellulose Acylate]

To the cellulose acylate of the invention may be added various additives (e.g., optical anisotropy-adjusting agent, wavelength dispersion-controlling agent, fine particles, plasticizer, UV-ray inhibitor, deterioration-preventing agent, and peeling agent). These additives will be described hereinafter. Also, the additives may be added to the dope anytime while the dope is prepared (in the step of preparing a solution of cellulose acylate). It is also possible to add the additives in a final step of preparing the dope. As specific examples of compounds capable of reducing optical anisotropy of the cellulose acylate film, there are illustrated those compounds which are described in, for example, paragraphs [0035] to [0058] of JP-A-2006-199855. However, the invention is not limited only to these compounds.

[Additives to Transparent Support]

Since the optical film of the invention is to be used in many cases on the viewing side of a display, it is preferred to incorporate a UV absorbent (UV ray absorbent) in the transparent support. Specific examples of the UV absorbent for the cellulose acylate film are described in, for example, paragraphs [0059] to [0135] of JP-A-2006-199855.

[Matting Agent Fine Particles]

Fine particles are preferably added as a matting agent, to the cellulose acetate film of the invention. Examples of the fine particles that can be used in the invention may include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate, and calcium phosphate. The fine particles are preferably those which contain silicon from the viewpoint of obtaining low turbidity, with silicon dioxide being particularly preferred. Fine particles of silicon dioxide are preferably those which have a primary average particle size of 20 nm or less and an apparent specific gravity of 70 g/L or more. Particles having a primary average particle size as small as 5 to 16 nm are able to reduce the haze of the film, thus being more preferred. The apparent specific gravity is preferably 90 to 200 g/L or more, more preferably 100 to 200 g/L or more. A larger apparent specific gravity makes it more possible to prepare a highly concentrated dispersion, which serves to provide better haze and coagulation, thus being preferred.

These fine particles usually form secondary particles having an average particle size of 0.1 to 3.0 µm, and these fine particles exist in the form of an aggregate of primary particles in the film to form projections of 0.1 to 3.0 µm on the surface of the film. The secondary average particle size is preferably 0.2 µm or more and 1.5 µm or less, more preferably 0.4 µm or more and 1.2 µm or less, most preferably 0.6 µm or more and 1.1 µm or less. The primary particle size and the secondary particle size are determined in the following manner: Particles in the film are observed by a scanning type electron microscope to measure the diameter of a circumscribed circle of a particle as a particle size. Also, 200 particles each in a different place are observed to calculate an average of the diameters of these particles to determine an average particle size. Also, the state of unevenness on the film surface can be measured by the technique of, for example, AFM.

The surface of the transparent support, having the projections, is preperably a surface on which the optical anisotropic layer is not stacked.

As the fine particles of silicon dioxide, commercially available products under such trade names as Aerosil R972, R972V, R974, R812, 200, 200V, 300, R202, OX50, TT600 (these being manufactured by Nippon Aerosil Co., Ltd.) may be used. As the fine particles of zirconium oxide, commercially available products under such trade names as Aerosil R976 and R811 (both being manufactured by Nippon Aerosil Co., Ltd.) may be used.

Among these, Aerosil 200V and Aerosil R972V are particularly preferred, since they are fine particles of silicon dioxide having an average primary particle size of 20 nm or less and an apparent specific gravity of 70 g/L or more, and having a large effect of dropping friction coefficient while maintaining the low turbidity of a resulting optical film.

[Plasticizer, Deterioration-Preventing Agent, and Peeling Agent]

In addition to the compounds capable of optically reducing anisotropy and UV absorbents, various additives (e.g., plasticizers, deterioration-preventing agents, peeling agents, infrared ray absorbents, etc.) may be added, as described hereinbefore, to the cellulose acylate film of the invention. They may be a solid product or an oily product. Detailed descriptions on these materials are given on pages 16 to 22 of *Kokai Giho of Japan Institute of Invention and Innovation* (Kogi No. 2001-1745, published on Mar. 15, 2001).

[Knurling]

The transparent support of the invention preferably has knurling portions at the film edges of the transparent support in order to suppress generation of black band or deformation of the film upon handling it in a roll form even when the transparent support has a large width and a small thickness. The knurling portions of the invention means portions which have a larger height and which are formed by imparting unevenness at the edges in the width direction of the transparent continuous support, and are preferably provided on both edges thereof. As a method for imparting unevenness to form the knurling portion, the knurling portion can be formed by pressing a heated emboss roll to the film. Fine unevenness is formed on the emboss roll, and unevenness of the film can be formed by pressing this against the film to impart a larger height to the edges. The height of knurling in the invention means the height from the film surface to top of the projection formed by embossing. The knurling portions may be provided on both surfaces of the film, or 3 or more knurling portions may be formed on one surface. The height of the knurling portion is preferably a height larger than the entire film thickness of the optical functional layers including the optically anisotropic layer and the hard coat layer, by 1 µm or more, and the width of one knurling portion is preferably in the range of from 5 mm to 30 mm In the case of providing the knurling portions on both sides of the film, it suffices that sum of the height of each knurling portion is larger by at least 1 µm or more. By adjusting the height larger by 1 µm or more, the effect of suppressing generation of black band and deformation of the film is obtained. The height of the knurling portion be preferably larger than the thickness of the entire optically functional film by 2 µm to 10 µm. By controlling the height in this range, generation of black band and deformation of the film can be prevented, and troubles of deformation of support due to winding slippage or bulge of the knurling portion do not occur.

In the invention, in the case where the thickness of the entire functional layers on both surfaces is as large as 3 µm or more and the functional layers have such a high surface smoothness that, when wound in a roll form, the layers are liable to closely adhere to each other, it is also possible to provide, prior to providing the optically anisotropic layer, knurling portions on the transparent support at the same or different positions on both surfaces thereof, to further provide, after providing the optically anisotropic layer, other knurling portions on the surface or back side of the support, or to conduct additional knurling at the already formed knurling portion after providing the optically anisotropic layer.

As to imparting knurling portion, methods described in JP-A-2005-99245 and JP-A-2005-219272 can be employed.

The width of the transparent continuous support is preferably from 1400 mm to 4000 mm, particularly preferably from 1400 to 3000 mm, because such support provides high productivity and high available efficiency in the case of applying the optical film to an image display device. In the case of using such wide transparent continuous support, the above-described first knurling portion and the second knurling portion are preferably provided not only at the edges of the transparent support but in the inside thereof. That is, it is preferable to provide plural rows of knurling portions on the transparent support. For example, when a knurling portion is provided at the center of the transparent support, blocking which is liable to occur at around the center of the wide transparent support can be prevented effectively. Also, the length of the transparent continuous support is preferably from 100 to 6000 mm, more preferably from 500 to 4000 mm

[Optically Anisotropic Layer]

In the invention, materials and production conditions can properly be selected according to various uses, and a λ/4 film using the polymerizable liquid crystalline compound is one preferred embodiment.

Initially, methods for measuring optical characteristics are described below. In this specification, Re(λ) and Rth(λ) indicate the in-plane retardation and the thickness-direction retardation of a film at a wavelength λ, respectively. Re(λ) is determined, using KOBRA 21ADH or WR (manufactured by Oji Scientific Instruments), with light having a wavelength of λ nm given to a film in the normal direction thereof. Upon selecting the measuring wavelength λ, a wavelength-selecting filter is manually exchanged or the measuring value is changed by programming before measurement. In the case where the film to be analyzed is a monoaxial or biaxial refractive index ellipsoid, its Rth(λ) is calculated as follows. Additionally, this measuring method is partly utilized in measuring the average tilt angle of discotic liquid crystal molecule in the optically anisotropic layer (to be described hereinafter) on the orientation film side and the average tilt angle on the opposite side.

Rth(λ) is calculated with KOBRA 21ADH or WR based on the retardation that is obtained by measuring the Re(λ) at a total of 6 points in directions inclined every 10° from the normal direction thereof to 50° from the normal line relative to the film surface around an in-plane slow axis (determined by KOBURA 21ADH or WR) as an inclination axis (rotation axis) (in the case where the film does not have a slow axis, any desired in-plane direction of the film may be taken as the rotation axis) for an incident light of a wavelength of λ nm entering from each of the directions of inclination, an average refraction index, and inputted film thickness.

In the above, for the film having a tilt angle at which the retardation thereof is zero with the in-plane slow axis from the normal direction taken as the rotation axis, its retardation at a tilt angle larger than that tilt angle is converted into the corresponding negative value and then calculated by KOBRA 21ADH or WR. Additionally, with the slow axis taken as the tilt axis (rotation axis) (in the case where the film does not have a slow axis, any desired in-plane direction of the film may be taken as the rotation axis), a retardation is determined in any desired two tilt directions and, based on the found data and the mean refractive index and the inputted film thickness, Rth of the film may also be calculated according to the following formulae (A) and (III):

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$ Formula (A)

In the above formula, $Re(\theta)$ represents a retardation in the direction tilted by an angle $\theta$ from the normal direction; nx in formula (A) represents the refractive index in the in-plane slow axis direction; ny represents the refractive index in the direction perpendicular to the in-plane nx; and nz represents the refractive index in the direction perpendicular to nx and ny. d represents a thickness.

$$Rth = ((nx+ny)/2 - nz) \times d$$ Formula (III):

In the case where the film to be analyzed cannot be expressed as a monoaxial or biaxial refractive index ellipsoid, or in the case where the film to be analyzed has no optical axis, then its $Rth(\lambda nm)$ may be calculated as follows:

$Rth(\lambda)$ is calculated with KOBRA 21ADH or WR based on the retardation that is obtained by measuring the Re ($\lambda$) at a total of eleven points in directions inclined every 10° from −50° up to +50° from the normal line relative to the film surface around an in-plane slow axis (determined by KOBURA 21ADH or WR) as an inclination axis (rotation axis) for an incident light of a wavelength of $\lambda$nm entering from each of the directions of inclination, an average refraction index and inputted thickness. Also, in the above measurement, as the average refractive index, catalogue values with various optical films described in Polymer Hand-book (JOHN WILEY & SONS<INC.) may be employed. With polymers having unknown average refractive index, the value may be obtained by measuring with an Abbe refractometer. Average refractive indices of major optical films are illustrated below: cellulose acylate (1.48); cycloolefin polymer (1.52); polycarbonate (1.59); polymethyl methacrylate (1.49); and polystyrene (1.59). By inputting the value of these average refraction indices and thickness, KOBRA 21ADH or WR calculates nx, ny, and nz. Further, Nz=(nx−nz)/(nx−ny) is calculated from the calculated nx, ny, and nz.

[Optically Anisotropic Layer Containing Liquid Crystalline Compound]

The kind of a liquid crystalline compound to be used for forming the optically anisotropic layer which the optical compensatory film has is not particularly limited. For example, an optically anisotropic layer, which can be obtained by forming a low molecular liquid crystalline compound in the nematic alignment in liquid crystal state, and forming an optically anisotropic layer which can be obtained by subjecting to fixation by optically crosslinking or thermally crosslinking, or forming a high molecular liquid crystalline compound in the nematic alignment in liquid crystal state, and then cooling to fixate the alignment, can be used. Further in the invention, even when a liquid crystalline compound is used in the optically anisotropic layer, the optically anisotropic layer is a layer fixed and formed by the polymerization or the like of the liquid crystalline compound, thus does not need to show crystallinity once the layer is formed. The polymerizable liquid crystalline compound may be a multifunctional polymerizable liquid crystalline compound, and may also be a monofunctional polymerizable liquid crystalline compound. In addition, the liquid crystalline compound may be a discotic liquid crystalline compound, and may also be a rod-shaped liquid crystalline compound.

In the optically anisotropic layer, the molecules of the liquid crystalline compound are preferably fixed in any one of the vertical alignment, the horizontal alignment, the hybrid alignment, and the inclined alignment. In order to prepare a retardation plate having symmetrical viewing angle dependence, it is preferred that disc plane of the discotic liquid crystalline compound is substantially vertical to the film plane (optically anisotropic layer plane) or that the long axis of the rod-shaped liquid crystalline compound is substantially horizontal to the film plane (optically anisotropic layer plane). That the discotic liquid crystalline compound is substantially vertical means that the average value of angles between the film plane (optically anisotropic layer plane) and the discotic plane of the discotic liquid crystalline compound is within the range of from 70° to 90°, with the average value being more preferably from 80° to 90°, still more preferably 85° to 90°. That the rod-shaped liquid crystalline compound is substantially horizontal means that the average value of angles between the film plane (optically anisotropic layer plane) and the director of the rod-shaped liquid crystalline compound is within the range of from 0° to 20°, with the average value being more preferably from 0° to 10°, still more preferably 0° to 5°.

In the case of preparing an optically compensatory film having non-symmetrical viewing angle dependence by orienting molecules of the liquid crystalline compound in a hybrid alignment, the average tilt angle of the director of the liquid crystalline compound is preferably from 5 to 85°, more preferably from 10 to 80°, still more preferably from 15 to 75.

The optical film contains the optically anisotropic layer containing the liquid crystalline compound. The optically anisotropic layer may be composed of a single layer or may be a layered body of two or more optically anisotropic layers.

The optically anisotropic layer can be formed by coating on a support a coating solution containing a liquid crystalline compound such as a rod-shaped liquid crystalline compound or a discotic liquid crystalline compound and, as needed, a polymerization initiator, an alignment controlling agent, and other additives to be described hereinafter. It is preferred to form the optically anisotropic layer by forming an orientation film on the support and coating the above-described coating solution on the surface of the orientation film.

[Discotic Liquid Crystalline Compound]

In the invention, it is preferred to form an optically anisotropic layer which the optical film has by using a discotic liquid crystalline compound. The discotic liquid crystalline compound is described in various publications (C. Destrade, et al., *Mol. Crysr. Liq. Cryst.*, Vol. 71, p. 111 (1981); *Chemical Society of Japan, Quarterly Journal of General Chemistry*, No. 22, *Chemistry of Liquid Crystal*, Chap. 5, Chap. 10, Sec. 2 (1994); B. Kohne, et al. *Angew. Chem. Soc. Chem. Comm.*, p. 1794 (1985); J. Zhang, et al., *J. Am. Chem. Soc.*, Vol. 116, p. 2655 (1994)). Polymerization of a discotic liquid crystalline compound is described in JP-A-8-27284.

As specific examples of discotic liquid crystalline compounds which can be preferably used in the invention, there are illustrated compounds described in paragraphs [0038] to of JP-A-2009-97002. Also, as triphenylene compounds which are discotic liquid crystalline compounds having a small wavelength dispersion, there are illustrated compounds described in paragraphs [0062] to [0067] of JP-A-2007-108732.

[Rod-Shaped Liquid Crystalline Compound]

In the invention, a rod-shaped liquid crystalline compound may be used. As the rod-shaped liquid crystalline compound, azomethines, azoxys, cyano biphenyls, cyano phenyl esters, benzoic acid esters, cyclohexanecarboxylic acid phenyl esters, cyano phenylcyclohexanes, cyano-substituted phenylpyrimidines, alkoxy-substituted phenylpyrimidines, phenyldioxanes, tolanes, and alkenyl cyclohexylbenzonitriles are preferably used. Not only these low-molecular weight liquid crystalline compounds, but also high-molecular weight liquid crystalline compounds can be used. It is more preferred to fix the alignment by polymerization of a rod-shaped liquid crystalline compound. A liquid crystalline compound having a partial structure which may undergo polymerization or crosslinking reaction with active light or electron ray, heat or the like can be preferably used. The number of such partial structures is preferably 1 to 6, more preferably 1 to 3. As the polymerizable rod-shaped liquid crystalline compound, compounds described in *Makromol. Chem.*, Vol. 190, p. 2255 (1989), *Advanced Materials*, Vol. 5, p. 107 (1993), U.S. Pat. Nos. 4,683,327, 5,622,648 and 5,770,107, WO95/22586, WO95/24455, WO97/00600, WO98/23580, WO98/52905, JP-A-1-272551, J-A-6-16616, JP-A-7-110469, JP-A-11-80081, and JP-A-2001-328973 can be used.

[Vertical Alignment Promoting Agent]

In order to uniformly align a liquid crystalline compound vertically upon forming the optically anisotropic layer, it is preferred to use an alignment controlling agent capable of vertically controlling alignment of the liquid crystalline compound in an alignment layer interface side and in an air interface side. For this purpose, it is preferred to form an optically anisotropic layer by using, for the alignment film, a composition which contains a compound that exerts the action of vertically aligning the liquid crystalline compound through an exclusion volume effect, an electrostatic effect, or a surface energy effect together with the liquid crystalline compound. Also, with respect to regulating the alignment on the side of the air interface side, it is preferred to form the optically anisotropic layer by using, upon alignment of the liquid crystalline compound, a composition which contains a compound that exerts the action of vertically aligning the liquid crystalline compound through an exclusion volume effect, an electrostatic effect, or a surface energy effect together with the liquid crystalline compound. As the compound (alignment layer interface side vertical alignment material) that promotes vertical alignment of the molecules of the liquid crystalline compound at the interface side of these alignment layers, a pyridinium derivative can be preferably used. As a compound (air interface side vertical alignment agent) that promotes vertical alignment of the molecules of the liquid crystalline compound at the air interface side of these alignment layers, a compound, which promotes localization of the above-mentioned compounds on the air interface side, containing at least one or more hydrophilic groups selected from a fluoro-aliphatic group, a carboxyl group (—COOH), a sulfo group (—SO$_3$H), a phosphonoxy group {—OP(=O)(OH)$_2$}, and their salts can be preferably used. Further, by blending these compounds, in the case of, for example, preparing the crystalline compound as a coating solution, the coatability of the coating solution is improved, and thus generation of unevenness and repelling are suppressed. The vertical alignment agent will be described in detail below.

[Alignment Layer Interface Side Vertical Alignment Agent]

As the alignment layer interface side vertical aligning agent usable in the invention, a pyridinium derivative (pyridinium salt) can be suitably used. As specific examples of such compound, there are illustrated those compounds which are described in paragraphs [0058] to [0061] of JP-A-2006-113500.

The content of the pyridinium derivative in the composition for forming the optically anisotropic layer is preferably in the range of from 0.005 to 8% by weight, more preferably from 0.01 to 5% by weight, in the composition (a liquid crystalline composition excluding a solvent in the case of preparing the composition as a coating solution), though varying depending upon its use.

[Air Interface Vertically Aligning Agent]

As the air interface vertically aligning agent in the invention, the following fluorine-containing polymers (containing formula (II) as a partial structure) or the fluorine-containing compounds represented by the following general formula (III) is preferably used.

First, fluorine-containing polymer (containing formula (II) as a partial structure) will be described. As the air interface vertically aligning agent, the fluorine-containing polymer is preferably a copolymer containing a repeating unit derived from a fluoro-aliphatic group-containing monomer and a repeating unit represented by the following formula (II).

(II)

In the formula, each of R$^1$, R$^2$, and R$^3$ independently represents a hydrogen atom or a substituent; L represents a divalent linking group selected from among the following linking groups or a divalent linking group formed by combining two or more of the following linking groups [linking groups: single bond, —O—, —CO—, —NR$^4$— (wherein R$^4$ represents a hydrogen atom, an alkyl group, an aryl group, or an aralkyl group), —S—, —SO$_2$—, —P(=O)(OR$^5$)- (wherein R$^5$ represents an alkyl group, an aryl group, or an aralkyl group), an alkylene group, and an arylene group]; and Q represents a carboxyl group (—COOH) or its salt, a sulfo group (—SO$_3$H) or its salt, or a phosphonoxy {—OP(=O)(OH)$_2$} or its salt.

The fluorine-containing polymer which can be used in the invention is characterized in that it contains a fluoro-aliphatic group and one or more hydrophilic groups selected from the group consisting of a carboxyl group (—COOH), a sulfo group (—SO$_3$H), or a phosphonoxy {—OP(=O)(OH)$_2$}, and salts thereof. As to kinds of the polymers, related descriptions are given on pages 1 to 4 in "*Revised Chemistry of Polymer Synthesis (Kaitei Porimar Gousei no Kagaku)*" written by OHTSU TAKAYUKI and published by Kagaku-Dojin Publishing Company, Inc in 1968. Examples thereof include polyolefins, polyesters, polyamides, polyimides, polyurethanes, polycarbonates, polysulfones, polyethers, polyacetals, polyketones, polyphenylene oxides, polyphenylene sulfides, polyarylates, PTFEs, polyvinylidene fluorides, and cellulose derivatives. The fluorine-containing polymer is preferably a polyolefin.

The fluorine-containing polymer is a polymer which has a fluoro-aliphatic group in side chain. The fluoro-aliphatic group contains preferably from 1 to 12 carbon atoms, more preferably from 6 to 10 carbon atoms. The aliphatic group may have a chain or cyclic structure, and the chain structure may be straight or branched. Among those, straight $C_{6-10}$ fluoro-aliphatic groups are preferred. The fluorine-substitution degree of the fluoro-aliphatic group is preferably decided, however not to be limited to, such that not less than 50%, more preferably not less than 60%, of the hydrogen atoms in the aliphatic group are replaced with fluorine atoms. The fluoro-aliphatic group in side chain is bound to the main chain through a linking group such as an ester bond, amido bond, imido bond, urethane bond, urea bond, ether bond, thioether bond, or aromatic ring.

As specific examples of the fluoro-aliphatic group-containing copolymer to be preferably used in the invention as the fluorine-containing polymer, there are illustrated those compounds which are described in paragraphs [0110] to [0114] in JP-A-2006-113500. However, the invention is not restricted at all by those specific examples.

The weight-average molecular weight of the fluorine-containing polymer to be used in the invention is preferably 1,000,000 or less, more preferably 100,000 or less, still more preferably 10,000 or less. When the weight-average molecular weight is within the above-described range, there can be obtained sufficient solubility and effective alignment control of the liquid crystalline compound. The weight-average molecular weight can be measured as a value in terms of polystyrene (PS) using gel permeation chromatography (GPC).

A preferred range of the content of the fluorine-containing polymer in the composition varies depending upon its use but, in the case of using for forming an optically anisotropic layer, the content (composition excluding a solvent in the case of preparing the composition as a coating solution) is preferably from 0.005 to 8% by weight, more preferably from 0.01 to 5% by weight, still more preferably from 0.05 to 3% by weight. In case when the addition amount of the fluorine-containing polymer is less than 0.005% by weight, there results insufficient effects whereas, in case when the content exceeds 8% by weight, drying of the coated film becomes insufficient, and detrimental influences are exerted on performance as an optical film (for example, uniformity of retardation).

Fluorine-containing compounds represented by the following (III).

$(R^0)_m—L^0—(W)_n$ (III):

In formula (III), R represents an alkyl group, an alkyl group having a $CF_3$ group at the end, or an alkyl group having a $CF_2H$ group at the end, m represents an integer of 1 or more. Each $R^0$ may be the same as or different from every other $R^0$, with at least one representing an alkyl group having a $CF_3$ group or a $CF_2H$ group at the end. $L^0$ represents an (m+n)-valent linking group, W represents a carboxyl group (—COOH) or its salt, a sulfo group (—$SO_3H$) or its salt, or a phosphonoxy {—OP(=O)(OH)$_2$} or its salt, and n represents an integer of 1 or more.

As specific examples of the fluorine-containing compound usable in the invention and represented by formula (III), there are illustrated those compounds which are described in paragraphs [0136] to [0140] in JP-A-2006-113500. However, the invention is not restricted at all by those specific examples.

A preferred range of the content of the fluorine-containing compound in the composition varies depending upon its use but, in the case of using for forming an optically anisotropic layer, the content (composition excluding a solvent in the case of preparing the composition as a coating solution) is preferably from 0.005 to 8% by weight, more preferably from 0.01 to 5% by weight, still more preferably from 0.05 to 3% by weight. The fluorine-containing compound of the present invention does not have a functional group (polymerizable group) capable of forming covalent bond to the binder, such as a liquid crystalline compound and an acrylate monomer, included in the optically anisotropic layer.

[Polymerization Initiator]

The aligned (preferably vertically aligned) liquid crystalline compound is fixed with maintaining the alignment state. Fixation is preferably conducted by polymerization reaction of a polymerizable group (P) introduced into the liquid crystalline compound. The polymerization reaction includes thermal polymerization reaction using a thermal polymerization initiator and a photo polymerization reaction using a photo polymerization initiator, with photo polymerization reaction being preferred. Examples of the photo polymerization initiator include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (described in JP-A-60-105667 and U.S. Pat. No. 4,239,850), and oxadiazole compounds (described in U.S. Pat. No. 4,212,970).

The amount of the photo polymerization initiator to be used is preferably from 0.01 to 20% by weight, more preferably from 0.5 to 5% by weight, based on the weight of the solid components of the coating solution. Light irradiation for polymerizing the liquid crystalline compound is preferably conducted by using UV rays. The irradiation energy is preferably from 20 mJ/cm$^2$ to 50 J/cm$^2$, more preferably from 100 to 800 mJ/cm$^2$. In order to accelerate photo polymerization reaction, light irradiation may be conducted under heating condition or at a low oxygen concentration of 0.1% or less. The thickness of the optically anisotropic layer containing the liquid crystalline compound is preferably from 0.1 to 10 μm, more preferably from 0.5 to 5 μm, most preferably from 1 to 5 μm.

[Other Additives to Optically Anisotropic Layer]

A plasticizer, a surfactant, a polymerizable monomer, or the like may be used together with above-mentioned liquid crystalline compound to improve uniformity of the coated film, film strength, and aligning properties of the liquid crystalline compound. These materials preferably have compatibility with the liquid crystalline compound so as not to inhibit alignment.

As the polymerizable monomer, there are illustrated radical-polymerizable or cation-polymerizable compounds. Polyfunctional radical-polymerizablel monomers are preferred, and those which are copolymerizable with the above-mentioned polymerizable group-containing liquid crystalline compound. For example, there are illustrated those described in paragraphs [0018] to [0020] in JP-A-2002-296423. The addition amount of the above-described compound is generally in the range of from 1 to 50% by weight, preferably in the range of from 5 to 30% by weight, based on the weight of the liquid crystalline compound.

As the surfactant, there are illustrated conventionally known compounds, with fluorine-containing compounds being preferred. Specifically, there are illustrated, for example, compounds described in paragraphs [0069] to [0126] in Japanese Patent Application No. 2003-295212.

The polymer to be used together with the liquid crystalline compound preferably can thicken the coating solution. Examples of the polymer include cellulose esters. As preferred examples of such cellulose esters, there are illustrated compounds described in paragraph [0178] in JP-A-2000-155216. The addition amount of the above-described polymer is preferably in the range of from 0.1 to 10% by weight, more preferably in the range of from 0.1 to 8% by weight, based on the weight of the liquid crystalline compound so as not to inhibit alignment of the liquid crystalline compound.

The discotic nematic liquid crystal phase-solid phase transition temperature of the liquid crystalline compound is preferably from 70 to 300° C., more preferably from 70 to 170° C.

The surface of the optically anisotropic layer of the invention containing the liquid crystalline compound is preferably in a smooth state in order to align the liquid crystalline compound with no defects. The smoothness in terms of arithmetic average roughness in roughness curve Ra (JIS B 0601:1998) is preferably from 0 to 0.05 μm, more preferably from 0.01 to 0.04 μm. With such smooth surface, the fluorine-containing compound for aligning a liquid crystalline compound tends to transfer when in contact with the surface of the hard coat layer facing in a roll state. However, this problem can be solved in the invention by controlling the surface profile and the surface free energy of the surface on the facing hard coat layer side.

[Coating Solvent]

As solvents to be used for preparing the coating solution, organic solvents are preferably used. Examples of the organic solvent include amides (e.g., N,N-dimethylformamide), sulfoxides (e.g., dimethylsulfoxide), heterocyclic compounds (e.g., pyridine), hydrocarbons (e.g., benzene and hexane), alkyl halides (e.g., chloroform and dichloromethane), esters (e.g., methyl acetate, ethyl acetate, and butyl acetate), ketones (e.g., acetone and methyl ethyl ketone), and ethers (e.g., tetrahydrofuran and 1,2-dimethoxyethane). Of these, alkyl halides and ketones are preferred. Two or more organic solvents may be used in combination thereof.

[Coating Method]

Coating of the coating solution can be conducted according to known methods (a wire-bar coating method, an extrusion coating method, a direct gravure coating method, a reverse gravure coating method, and a die coating method).

[Alignment Film]

In the invention, it is preferred to coat the aforesaid composition on the surface of an alignment film to thereby align molecules of the liquid crystalline compound. Since the alignment film has the function of regulating alignment direction of the liquid crystalline compound, it is preferred to utilize the film to realize a preferred embodiment of the invention. However, after fixing the alignment state of the liquid crystalline compound, the alignment film is not necessary as a constituent of the invention since the alignment film has already served as an alignment film. That is, it is possible to transfer only the optically anisotropic layer, wherein the alignment state has been fixed, on the alignment film to a different transparent support to prepare an optical substrate for an optical film of the invention.

An alignment film can be prepared by means of the rubbing treatment of an organic compound (preferably a polymer), oblique evaporation of an inorganic compound, formation of a layer having microgrooves, or accumulation of organic compounds (e.g., ω-tricosanic acid, dioctadecylmethylammonium chloride, and methyl stearate) by Langmuir-Blodgett method. Further, an alignment film that exhibits an alignment function by a given electric field, a given magnetic field, or light irradiation, is also known.

The alignment film is preferably formed by rubbing treatment of a polymer. Examples of the polymer include methacrylate series copolymers described in paragraph [0022] of JP-A-8-338913, styrene series copolymers, polyolefins, polyvinyl alcohol and modified polyvinyl alcohols, poly(N-methylolacrylamide), polyesters, polyimides, vinyl acetate copolymers, carboxymethyl cellulose, and polycarbonates. It is possible to use a silane coupling agent as a polymer. Water-soluble polymers (e.g., poly(N-methylolacrylamide), carboxymethyl cellulose, gelatin, polyvinyl alcohol, and modified polyvinyl alcohol) are preferred, gelatin, polyvinyl alcohol, and modified polyvinyl alcohols are more preferred, and polyvinyl alcohol and modified polyvinyl alcohols are most preferred.

The saponification degree of the polyvinyl alcohol is preferably from 70 to 100%, more preferably from 80 to 100%. The polymerization degree of polyvinyl alcohol is preferably from 100 to 5000.

In the alignment film, it is preferred to bind a side chain having a cross-linkable functional group (e.g., double bond) to the main chain or to introduce into the side chain a cross-linkable functional group having the function of aligning the liquid crystalline molecules. As the polymer to be used in the alignment film, either of polymers which itself can undergo cross-linking and a polymers which can be cross-linked with a cross-linking agent can be used, and a combination of plural of them can be used.

It is possible to copolymerize a polymer in an alignment film and a multi-functional monomer in an optically anisotropic layer, when the polymer in the alignment film has a main chain bonding to side chains containing a cross-linkable functional group or when the polymer in the alignment film has side chain being capable of aligning liquid-crystalline molecules and containing a cross-linkable functional group. In such case, not only between the multi-functional monomer and the multi-functional monomer but also between the polymer in the alignment film and the polymer in the alignment film and between the multi-functional monomer and the polymer in the alignment layer, strong covalent bonds are formed. Thus, in such case, the strength of the optical compensatory film can be remarkably improved by introducing a cross-linking functional group into the polymer in the alignment film.

The polymerizable functional group of the polymer in the alignment film preferably has a polymerizable group as with the multifunctional monomers. Specific examples include those described in paragraphs [0080] to [0100] in JP-A-2000-155216.

The polymer in the alignment film may be cross-linked by a cross-linking agent apart from the cross-linkable functional group. Examples of the cross-linking agent include aldehydes, N-methylol compounds, dioxane derivatives, compounds to act when their carboxyl groups are activated, active vinyl compounds, active halogen compounds, isoxazoles, and dialdehyde starches. Two or more of the cross-linking agents may be used in combination thereof. Specific examples of the cross-linking agent include the compounds described in paragraphs [0023] to [0024] in JP-A-2002-62426. Aldehydes having a high reactivity are preferred, with glutaraldehydes being particularly preferred.

The addition amount of the cross-linking agent is preferably from 0.1 to 20% by weight, more preferably from 0.5 to 15% by weight, based on the weight of the polymer. The residual amount of the unreacted cross-linking agent in the alignment film is preferably not greater than 1.0% by weight, more preferably not greater than 0.5% by weight. When the residual amount falls within the range, the alignment film has a sufficient durability, and even when the alignment film is used in a liquid-crystal display device for a long time, or is left under a high temperature and humidity atmosphere for a long time, no reticulation occurs in the alignment film.

The alignment film may be fundamentally formed by applying a solution containing the above-described polymer which is an alignment film-forming material, the cross-linking agent, and the additives to the surface of a transparent support, drying under heating (to cross-link), and performing a rubbing treatment. The cross-linking reaction may be carried out any time after applying the coating solution to the surface as described above. When a water-soluble polymer such as polyvinyl alcohol is used for preparation of an alignment film, the coating solution is preferably prepared by using a mixed solvent of an organic solvent having defoaming action (e.g., methanol) and water. The weight ratio of water to methanol is desirably from 0/100 to 99/1, more preferably from 0/100 to 91/9. Using such a mixed solvent can prevent bubbles from generating and can remarkably reduce defects in the surface of the alignment film and the optically anisotropic layer.

The coating method to be utilized upon formation of the alignment film is preferably a spin-coating method, a dip coating method, a curtain coating method, an extrusion coating method, a rod coating method, or a roll coating method. The rod coating method is especially preferred. The thickness of the alignment film after being dried is preferably from 0.1 to 10 μm. Drying under heating can be carried out at 20 to 110° C. In order to form sufficient cross-linkage, drying is desirably carried out at 60 to 100C°, particularly preferably at 80 to 100C°. The drying may be completed in 1 minute to 36 hours, preferably in 1 minute to 30 minutes. The pH is desirably set in an optimal range for a cross-linking agent to be used and, when glutaraldehyde is used, the pH is preferably set in a range of from 4.5 to 5.5.

The alignment film is preferably provided on the surface of a transparent support. The alignment film can be obtained by applying a rubbing treatment to the surface of the polymer layer after cross-linking the polymer layer as described above.

As the rubbing treatment, any known treatment widely used in a liquid-crystal alignment step of LCD. That is, a method of attaining alignment by rubbing the surface of the alignment film with paper, gauze, felt, rubber, nylon fibers, polyester fibers or the like in a definite direction can be employed. Generally, the rubbing treatment is carried out by rubbing several times with a fabric in which fibers having a uniform length and line thickness are implanted averagely.

Molecules of the liquid crystalline compound are aligned by coating the aforesaid composition on the rubbing-treated surface of the alignment film. Then, if necessary, the alignment film polymer and the multi-functional monomer contained in the optically anisotropic layer are reacted with each other, or the alignment film polymer is cross-linked by using a cross-linking agent to form the aforesaid optically anisotropic layer.

[Polarizing Plate]

The polarizing plate of the invention has a polarizing film and two protective films for protecting both surfaces of the polarizing film, in which the optical film of the invention is preferably used as at least one of the polarizing plate-protective films.

As the polarizing film of the polarizing plate, there are an iodine-containing polarizing film, a dye-containing polarizing film using a dichroic dye, and a polyene-containing polarizing film. The iodine-containing polarizing film and the dye-containing polarizing film can be produced generally using a polyvinyl alcohol film.

A structure of the polarizing plate is preferred wherein the side of the optical film, on which the optically anisotropic layer containing the liquid crystalline compound is provided, is adhered to one side of the polarizing film via an adhesive or via other substrate, with a protective film being provided on the other side of the polarizing film. More preferred is the structure wherein the optically anisotropic layer of the optical film is directly adhered to the polarizing film via an adhesive. In order to improve adhesion properties between the optically anisotropic layer and the polarizing film, the surface of the optically anisotropic layer is preferably subjected to surface treatment (e.g., glow discharge treatment, corona discharge treatment, plasma treatment, ultraviolet ray (UV) treatment, flame treatment, saponification treatment, or washing with a solvent). It is also possible to provide an adhesive layer (undercoat layer) on the optically anisotropic layer.

Also, an adhesive layer may be provided on the opposite side of the other protective film, which constitutes the polarizing plate, to the polarizing film.

Use of the optical film of the invention as a protective film for a polarizing plate enables preparation of a polarizing plate having excellent physical strength, antifouling properties, and durability in addition to optical performance expected for a λ/4 film or the like.

Also, the polarizing plate of the invention can have optically compensatory function. In such case, it is preferred that the optical film is provided on only one side of the surface side and the back side of two surface protective films and that the surface protective film on the side opposite to the optical film side of the polarizing plate is an optically compensatory film.

[Image Display Device]

The optical film and the polarizing plate of the invention can be used to constitute the surface of an image display device for the use of, for example, organic electroluminescence devices, touch panels, 3D display devices, and spectacles for viewing a 3D display device.

The characteristics of the invention will be more specifically described by reference to Examples and Comparative Examples. Materials, amounts of use, proportions, contents of treatments, treating manners, etc. can properly be altered as long as the gist of the invention is not exceeded. Therefore, the scope of the invention is not to be construed to be restricted by the specific examples to be described hereinafter. Additionally, "parts" and "%" are by weight unless otherwise specified.

EXAMPLE

Production Example 1 of Optical Film

[Production 1 of Optical Substrate]
<Preparation of Transparent Support (Cellulose Acetate Film T1)>

The following composition was placed in a mixing tank, and was stirred under heating to solve respective components, thus a cellulose acetate solution being prepared.
(Formulation of Cellulose Acetate Solution)

| | |
|---|---|
| Cellulose acetate of 60.7 to 61.1% in degree of acetification | 100 parts by weight |
| Triphenyl phosphate (plasticizer) | 7.8 parts by weight |
| Biphenyldiphenyl phosphate (plasticizer) | 3.9 parts by weight |

| | |
|---|---|
| Methylene chloride (first solvent) | 336 parts by weight |
| Methanol (second solvent) | 29 parts by weight |
| 1-Butanol (third solvent) | 11 parts by weight |

In a separate mixing tank were placed 16 parts by weight of the following retardation-increasing agent (A), 92 parts by weight of methylene chloride, and 8 parts by weight of methanol, and the resulting mixture was stirred under heating to prepare a solution of the retardation-increasing agent. 25 parts by weight of the solution of the retardation-increasing agent was mixed with 474 parts by weight of the cellulose acetate solution, and the resulting mixture was sufficiently stirred to prepare dope A containing 22.4% by weight of solid components. The addition amount of the retardation-increasing agent was 6.0 parts by weight per 100 parts by weight of cellulose acetate.

Retardation-Increasing Agent (A)

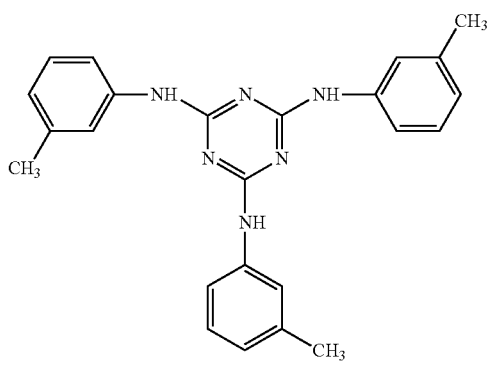 [SMILES: Cc1cccc(Nc2nc(Nc3cccc(C)c3)nc(Nc3cccc(C)c3)n2)c1]

Silica particles of 16 nm in average particle size (AEROSIL R972 manufactured by Nippon Aerosil Co., Ltd.) were added to the above-described dope A in an amount of 0.02 part by weight per 100 parts by weight of cellulose acetate to prepare dope B containing the matting agent. The concentration of solid components was adjusted to 19% by weight by using the solvent having the same solvent formulation as with the dope A.

Casting was conducted using a band stretching machine so that the dope A formed the main stream and the dope B formed both the undermost layer and the uppermost layer. When the surface temperature of the film on the band reached 40° C., the film was dried for 1 minute with a 70° C. hot air, and then the film was removed from the band. The film was then dried for 10 minutes with a 140° C. drying air to prepare cellulose acetate film T1 containing 0.3% by weight of the residual solvent. The casting amount was adjusted so that the thickness of the undermost layer and the uppermost layer both containing the matting agent became 3μm and the thickness of the main stream became 54 μm.

The thus-obtained continuous cellulose acetate film T1 had a width of 2300 mm and a thickness of 60 μm. Also, in-plane retardation (Re) was 6 nm, and retardation (Rth) in thickness direction was 60 nm <Preparation of Transparent Support (Cellulose Acetate Film T2)>

Cellulose acetate film T2 was prepared in the same manner as in the above-described preparation of the cellulose acetate film T1 except for changing the thickness of the film by adjusting the casting amount of the dope A. The entire thickness of the cellulose acetate film T2 was 80 μm, and Re and Rth were 8 nm and 78 nm, respectively.

<Preparation of Transparent Support (Cellulose Acetate Film T3)>

The following composition was placed in a mixing tank, and was stirred under heating to dissolve each component, thus, a cellulose acetate solution containing 22% by weight of solid components (dope C) being prepared.

(Formulation of Cellulose Acetate Solution)

| | |
|---|---|
| Cellulose acetate of 60.7 to 61.1% in degree of acetification | 100 parts by weight |
| Triphenyl phosphate (plasticizer) | 7.8 parts by weight |
| Biphenyldiphenyl phosphate (plasticizer) | 3.9 parts by weight |
| UV ray absorbent (TINUVIN 328, manufactured by CIBA Japan) | 0.9 part by weight |
| UV ray absorbent (TINUVIN 326, manufactured by CIBA Japan) | 0.2 part by weight |
| Methylene chloride (first solvent) | 336 parts by weight |
| Methanol (second solvent) | 29 parts by weight |
| 1-Butanol (third solvent) | 11 parts by weight |

Silica particles of 16 nm in average particle size (AEROSIL R972 manufactured by Nippon Aerosil Co., Ltd.) were added to the above-described dope C in an amount of 0.02 part by weight per 100 parts by weight of cellulose acetate to prepare dope D containing the matting agent. The concentration of solid components was adjusted to 19% by weight by using the solvent having the same solvent formulation as with the dope C.

Casting was conducted using a band stretching machine so that the dope C formed the main stream and the dope D formed both the undermost layer and the uppermost layer. When the surface temperature of the film on the band reached 40° C., the film was dried for 1 minute with a 70° C. hot air, and then the film was removed from the band. The film was then dried for 10 minutes with a 140° C. drying air to prepare cellulose acetate film T3 containing 0.3% by weight of the residual solvent. The casting amount was adjusted so that the thickness of the undermost layer and the uppermost layer both containing the matting agent became 3μm and the thickness of the main stream became 74 μm.

The thus-obtained continuous cellulose acetate film T3 had a width of 2300 mm and a thickness of 80 μm. Also, in-plane retardation (Re) was 3 nm, and retardation (Rth) in thickness direction was 45 nm <<Formation of Optically Anisotropic Layer Containing Liquid Crystalline Compound>>

(Saponification Treatment with Alkali)

The cellulose acylate film T1 was passed between induction heating rolls of 60° C. to increase the temperature of the film surface to 40° C., and then an alkali solution of the following formulation was coated on the band surface of the film in a coating amount of 14 ml/m² using a bar coater. The film was then conveyed for 10 seconds under a steam type infrared ray heater heated to 100° C. (manufactured by NORITAKE Co., Limited). Successively, pure water was applied in an amount of 3 ml/m² similarly using a bar coater. Subsequently, after repeating 3 times the procedures of washing with water by a fountain coater and removing water by an air knife, the film was conveyed through a 70° C. drying zone for 10 seconds to dry, thus a cellulose acylate film subjected to saponification treatment with alkali being prepared.

(Formulation of the Alkali Solution)

| Formulation of alkali solution (parts by weight) | |
|---|---|
| Potassium hydroxide | 4.7 parts by weight |
| Water | 15.8 parts by weight |
| Isopropanol | 63.7 parts by weight |

-continued

| Formulation of alkali solution (parts by weight) | |
|---|---|
| Surfactant SF-1:<br>C$_{14}$H$_{29}$O(CH$_2$CH$_2$O)$_2$OH | 1.0 part by weight |
| Propylene glycol | 14.8 parts by weight |

(Formation of Alignment Film)

A coating liquid of the following formulation for forming an alignment film was continuously coated on the continuous cellulose acetate film subjected to the saponification treatment as described above, using a #14 wire bar. The coated film was dried for 60 seconds with a 60° C. hot air and, further, for 120 seconds with a 100° C. hot air.

Formulation of the coating liquid for forming alignment film:

| Modified polyvinyl alcohol described below | 10 parts by weight |
|---|---|
| Water | 371 parts by weight |
| Methanol | 119 parts by weight |
| Glutaraldehyde | 0.5 part by weight |
| Photo polymerization initiator<br>(Irgacure 2959, manufactured by CIBA Japan) | 0.3 part by weight |

Modified polyvinyl alcohol

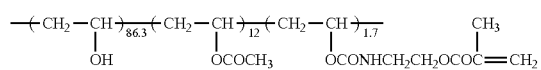

[Formation of Optically Anisotropic Layer Containing Discotic Liquid Crystalline Compound]

The above-prepared alignment film was continuously subjected to rubbing treatment. In this occasion, the longitudinal direction of the continuous film and the conveying direction were parallel to each other, and the rotation axis of the rubbing roller was tilted at 45° in the counterclockwise direction with respect to the longitudinal direction of the film.

A coating liquid B of the following formulation containing a discotic crystalline compound was continuously coated on the above-prepared alignment film using a #2.7 wire bar. The film-conveying velocity (V) was adjusted to 36m/min. The film was heated for 90 seconds with a 120° C. hot air for removing the solvent of the coating liquid and ripening alignment of the discotic liquid crystalline compound. Successively, UV irradiation was conducted at 80° C. to fix alignment of the liquid crystlline compound to form a 1-μm thick optically anisotropic layer, thus an optical substrate F1 being obtained.

Formulation of the Coating Liquid (B) for Forming the Optically Anisotropic Layer

| Discotic liquid crystalline compound shown below | 100 parts by weight |
|---|---|
| Photo polymerization initiator<br>(Irgacure 907, manufactured by CIBA GEIGY) | 3 parts by weight |
| Sensitizing agent<br>(KAYACURE DETX, manufactured by Nippon Kayaku) | 1 part by weight |
| Pyridinium salt shown below | 1 part by weight |

| Fluorine-containing polymer (FP2) shown below | 0.4 part by weight |
|---|---|
| Methyl ethyl ketone | 252 parts by weight |

Discotic liquid crystal compound

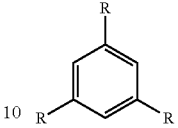

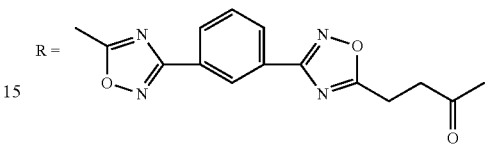

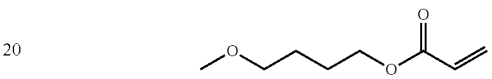

Pyridinium salt

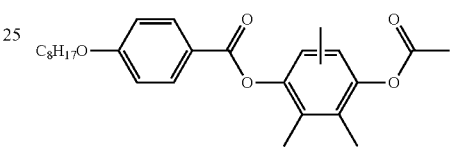

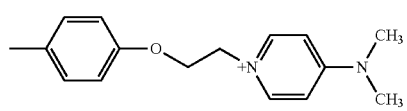

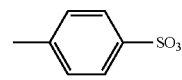

Fluorine-containing polymer (FP2)

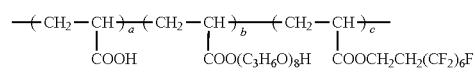

a/b/c = 5/55/40
Mw = 15000

The prepared optical substrate F1 had Re at 550nm of 145 nm and an Nz value of 0.53. The slow axis direction was at right angle with the rotation axis of the rubbing roller. That is, the slow axis was in the direction of 45° clockwise with respect to the longitudinal direction of the support. The average tilt angle of the disc planes of the discotic crystalline molecules with respect to the film plane was 90°, and thus it is confirmed that the discotic liquid crystal was vertically aligned with respect to the film plane. The arithmetic average roughness in roughness curve Ra (JIS B 0601:1998) of the surface on the optically anisotropic side wais in the range of from 0.01 to 0.04 μm, thus the surface having high smoothness. The fluorine-containing polymer (FP2) did not form covalent bond to the discotic liquid crystal compound which is the binder of the optically anisotropic layer.

[Production 2 of Optical Substrate]

In production 2 of the optical substrate, the cellulose acetate film was changed to T2, and the band-side surface of the cellulose acetate film T2 was subjected to saponification treatment. Further, an alignment film was provided in the same manner as in Production Example 1. The thus-prepared alignment film was continuously subjected to rubbing treatment. In this occasion, the longitudinal direction of the continuous film and the conveying direction were parallel to each other, and the rotation axis of the rubbing roller was adjusted to the direction of 45° counterclockwise with respect to the longitudinal direction of the film.

A coating liquid C of the following formulation containing a discotic crystalline compound was continuously coated on the above-prepared alignment film using a #3.6 wire bar. The film-conveying velocity (V) was adjusted to 36m/min. The film was heated for 90 seconds with a 120° C. hot air for removing the solvent of the coating liquid and ripening alignment of the discotic liquid crystalline compound. Successively, UV irradiation was conducted at 80° C. to fix alignment of the liquid crystalline compound to form an optically anisotropic layer having a thickness of 1.6μm, thus an optical substrate F2 being obtained.

The prepared optical substrate F2 had Re at 550nm of 125 nm and an Nz value of 0.9. The slow axis direction was at right angle with the rotation axis of the rubbing roller. That is, the slow axis was in the direction of 45° clockwise with respect to the longitudinal direction of the support. The average tilt angle of the disc planes of the discotic crystalline molecules with respect to the film plane was 90°, and thus it was confirmed that the discotic liquid crystal was vertically aligned with respect to the film plane. The arithmetic average roughness in roughness curve Ra (JIS B 0601:1998) of the surface on the optically anisotropic side wais in the range of from 0.01 to 0.04 μm, thus the surface having high smoothness. The fluorine-containing polymers (FP-1) and (FP-3) did not form covalent bond to the discotic liquid crystal compound or the acrylate monomer which are the binder of the optically anisotropic layer.

Formulation of the Coating Liquid (C) for Forming the Optically Anisotropic Layer

| | |
|---|---|
| Discotic liquid crystalline compound shown below | 91 parts by weight |
| Acrylate monomer shown below | 5 parts by weight |
| Photo polymerization initiator | 3 parts by weight |
| (Irgacure 907, manufactured by CIBA GEIGY) | |
| Sensitizing agent | 1 part by weight |
| (KAYACURE DETX, manufactured by | |
| Nippon Kayaku) | |
| Pyridinium salt shown below | 0.5 part by weight |
| Fluorine-containing polymer (FP1) shown below | 0.2 part by weight |
| Fluorine-containing polymer (FP3) shown below | 0.1 part by weight |
| Methyl ethyl ketone | 189 parts by weight |

Discotic liquid crystalline compound

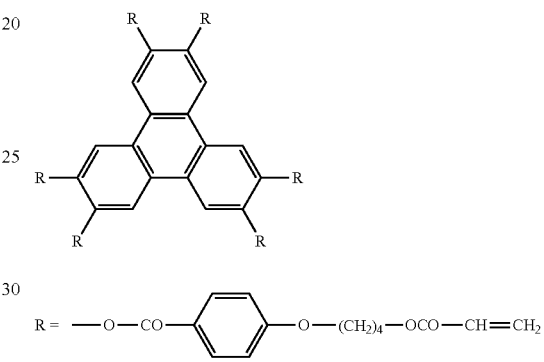

Acrylate monomer:

Ethylene oxide-modified trimethylolpropane triacrylate (V#360, manufactured by OSAKA ORGANIC CHEMICAL INDUSTRY LTD.)

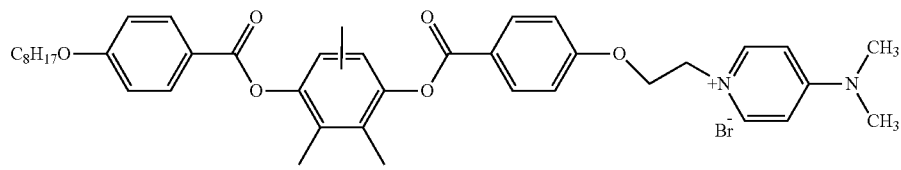

Pyridinum salt

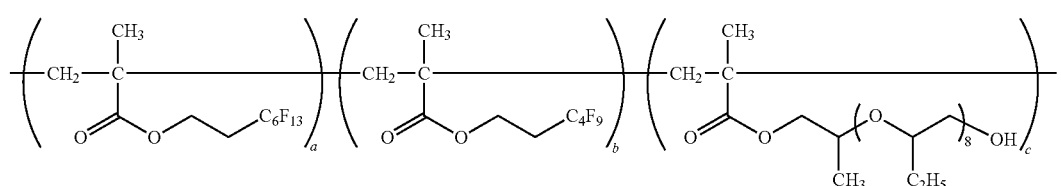

Fluorine-containing polymer (FPl)
a/b/c = 20/20/60 wt %
Mw = 16000

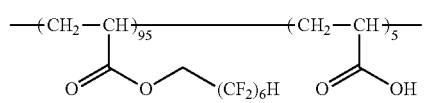

Fluorine-containing polymer (FP3)
Mw = 17,000

[Production 3 of Optical Substrate]

An optical substrate F3 was prepared in the same manner as with the method for producing the optical substrate F1 except for changing the cellulose acetate film to T3 in the production process 1 for the optical substrate. The prepared optical substrate F3 had Re at 550nm of 143 nm and an Nz value of 0.4. The arithmetic average roughness in roughness curve Ra (JIS B 0601:1998) of the surface on the optically anisotropic side was in the range of from 0.01 to 0.04 μm, thus the surface having high smoothness.

[Production 4 of Optical Substrate]

A cellulose acetate (dope C) was prepared in the same manner as in the method for preparing the above-described cellulose acetate film T3, the dope C served as a dope for inner layer.

Silica particles of 16 nm in average particle size (AEROSIL R972 manufactured by Nippon Aerosil Co., Ltd.) were added to the above-described dope C in an amount of 0.05 part by weight per 100 parts by weight of cellulose acetate to prepare dope E containing the matting agent for outer layer. The concentration of solid components in the dope E was adjusted to 20% by weight by using the solvent having the same solvent formulation as with the dope C.

Silica particles of 16 nm in average particle size (AEROSIL R972 manufactured by Nippon Aerosil Co., Ltd.) were added to the above-described dope C in an amount of 0.25 part by weight per 100 parts by weight of cellulose acetate to prepare dope F containing the matting agent for outer layer. The concentration of solid components in the dope F was adjusted to 20% by weight by using the solvent having the same solvent formulation as with the dope C.

The dopes C, E and F were co-casted on a mirror-surface stainless substrate so that the dope C formed an inner layer, the dope E formed the undermost layer, and the dope F formed the uppermost layer. When the surface temperature of the film on the substrate reached 40° C., the film was dried for 1 minute with a 70° C. hot air, and then the film was removed from the band. The film was then dried for 10 minutes with a 140° C. drying air to prepare cellulose acetate film T4. The casting amount was adjusted so that the thickness of the outer layer formed in a substrate-side, the inner layer, and the outer layer formed in an air-surface-side became 3 μm, 75 μm, and 2 μm, respectively.

The thus-obtained continuous cellulose acetate film T4 had a width of 2300 mm and a thickness of 80 μm. Also, in-plane retardation (Re) was 2 nm, and retardation (Rth) in thickness direction was 40 nm

[Forming Hard Coat Layer]

A coating liquid for each hard coat layer is prepared as shown below. (Preparation of Coating Liquid HC-1 for Forming Hard Coat Layer)

The following components are mixed, and the final solvent formulation is adjusted so that a mixture of MIBK (methyl isobutyl ketone) and MEK (methyl ethyl ketone) becomes with a mixing ratio of 50:50 (% by weight), thus a mixture solution of 50% by weight in solid content being finally obtained.

| | |
|---|---|
| PET-30 (100%) | 60.0 g |
| Biscoat 360 (100%) | 40.0 g |
| Irgacure 127 (100%) | 3.0 g |
| 8-μm, cross-linked acryl particles (30% dispersion) | 11.0 g |
| 8-μm, cross-linked acryl/styrene particles (30% dispersion) | 7.0 g |
| CAB polymer (20% solution) | 10.0 g |
| SP-13 (2% solution) | 1.0 g |

The above-described coating liquid for forming the hard coat layer is filtered through a polypropylene-made filter having a pore size of 30 μm to prepare a coating liquid. With the above-described coating liquid, the refractive index of the matrix after curing is 1.525. Materials used are shown below.

8-μm, cross-linked acryl particles: refractive index: 1.49 (30% by weight MIBK dispersion)

8-μm, cross-linked acryl/styrene: refractive index: 1.55 (30% by weight MIBK dispersion)

PET-30: mixture of pentaerythritol triacrylate and pentaerythritol tetraacrylate [manufactured by Nippon Kayaku]

Biscoat 360: ethylene oxide-modified trimethylolpropane triacrylate [manufactured by OSAKA ORGANIC CHEMICAL INDUSTRY LTD.]

CAB polymer: cellulose acetate butyrate (20% by weight solution) [manufactured by Eastman Chemical Company; 531·1 MIBK solution]

Irgacure 127: polymerization initiator [Ciba Specialty Chemicals]

Leveling agent (SP-13): 2% by weight MEK solution of the following fluorine-containing polymer

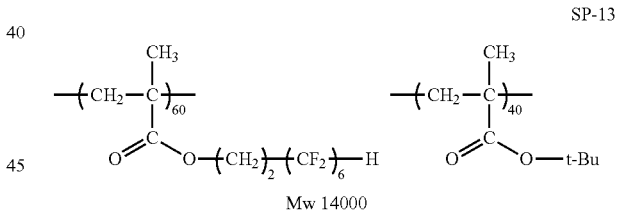

Coating liquids HC-2 to HC-7 are prepared by changing kind and content of the particles, and kinds and amounts of other additives in the coating liquid HC-1 for forming the above-described hard coat layer as shown in the following Table 1.

TABLE 1

| Hard Coat Layer Coating Liquid No. | Particle 1 Kind | Particle 1 Content | Particle 2 Kind | Particle 2 Content | Other Additive Kind | Other Additive Content |
|---|---|---|---|---|---|---|
| HC-1 | 8-μm crosslinked acryl particles (refractive index 1.49) | 3.3 | 8-μm crosslinked acryl/styrene particles (refractive index 1.55) | 2.1 | — | — |
| HC-2 | 6-μm crosslinked acryl/styrene particles (refractive index 1.52) | 10.0 | — | — | — | — |

TABLE 1-continued

| Hard Coat Layer Coating Liquid No. | Particle 1 Kind | Particle 1 Content | Particle 2 Kind | Particle 2 Content | Other Additive Kind | Other Additive Content |
|---|---|---|---|---|---|---|
| HC-3 | 8-μm crosslinked acryl particles (refractive index 1.49) | 14.0 | 8-μm crosslinked acryl/styrene particles (refractive index 1.55) | 7.0 | — | — |
| HC-4 | Aggregated silica particles (secondary aggregate particle size: 4 μm; refractive index 1.46) | 30.0 | — | — | — | — |
| HC-5 | 8-μm crosslinked acryl particles (refractive index 1.49) | 20.0 | 8-μm crosslinked acryl/styrene particles (refractive index 1.55) | 10.0 | — | — |
| HC-6 | — | — | — | — | — | — |
| HC-7 | 6-μm crosslinked acryl/styrene particles (refractive index 1.52) | 10.0 | — | — | Fluorine-containing compound (d-1) of formula (F-4) | 3.0 |

(Preparation of a Coating Liquid Mn-1 for Forming a Medium Refractive Index Layer)

A phosphorous-containing tin oxide (PTO) dispersion (ELCOM JX-1001 PTV manufactured by Catalysts & Chemicals Industries Co., Ltd.), and a mixture (DPHA) of dipentaerythritol pentaacrylate and dipentaerythritol hexaacrylate were mixed to prepare a coating liquid for a medium refractive index layer having a refractive index adjusted to 1.62.

(Preparation of a Coating Liquid Hn-1 for Forming a High Refractive Index Layer)

61.9 parts by weight of methyl ethyl ketone, 3.4 parts by weight of methyl isobutyl ketone, and 1.1 parts by weight of cyclohexanone were added to 15.7 parts by weight of a $ZrO_2$ fine particle-containing hard coat agent (Desolite Z7404 [refractive index: 1.72, solid content concentration: 60% by weight; content of zirconium oxide fine particles: 70% by weight (based on solid content), average particle size of zirconium oxide fine particles: about 20 nm; solvent formulation: methyl isobutyl ketone/methyl ethyl ketone=9/1; manufactured by JSR Corp.]). The mixture was stirred, and then filtered through a polypropylene-made filter having a pore size of 0.4 μm to prepare a coating liquid for a high refractive index layer.

(Preparation of Coating Liquids Ln-1 to Ln-6 for Forming a Low Refractive Index Layer)

The following components were mixed as shown below, and the resulting mixture was dissolved in a 90/10 mixture (weight ratio) of MEK/MMPG-AC to prepare coating liquids for a low refractive index layer containing 5% by weight of solid component.

(Formulation of Ln-1)

| | |
|---|---|
| Perfluoro-olefin copolymer (P-1) shown below | 15 parts by weight |
| DPHA | 7 parts by weight |
| RMS-033 | 5 parts by weight |
| Fluorine-containing compound (M-1) shown below | 20 parts by weight |
| Hollow silica particles (as solid component) | 50 parts by weight |
| Irgacure 127 | 3 parts by weight |

(Formulation of Ln-2)

| | |
|---|---|
| Perfluoro-olefin copolymer (P-1) shown below | 15 parts by weight |
| DPHA | 7 parts by weight |
| OPTOOL DAC | 5 parts by weight |
| Fluorine-containing monomer (M-1) shown below | 20 parts by weight |
| Hollow silica particles (as solid component) | 50 parts by weight |
| Irgacure 127 | 3 parts by weight |

(Formulation of Ln-3)

| | |
|---|---|
| Perfluoro-olefin copolymer (P-1) shown below | 15 parts by weight |
| DPHA | 7 parts by weight |
| Specific example (d-4) of formula (F-4) | 5 parts by weight |
| Fluorine-containing monomer (M-1) shown below | 20 parts by weight |
| Hollow silica particles (as solid component) | 50 parts by weight |
| Irgacure 127 | 3 parts by weight |

(Formulation of Ln-4)

| | |
|---|---|
| DPHA | 32 parts by weight |
| RMS-033 | 5 parts by weight |
| Hollow silica particles (as solid component) | 60 parts by weight |
| Irgacure 127 | 3 parts by weight |

(Formulation of Ln-5)

| | |
|---|---|
| DPHA | 67 parts by weight |
| RMS-033 | 5 parts by weight |
| MEK-ST (as solid component) | 25 parts by weight |
| Irgacure 127 | 3 parts by weight |

(Formulation of Ln-6)

| | |
|---|---|
| Perfluoro-olefin copolymer (P-1) shown below | 15 parts by weight |
| DPHA | 7 parts by weight |
| Fluorine-containing monomer (M-1) shown below | 20 parts by weight |
| Hollow silica particles (as solid component) | 50 parts by weight |
| Irgacure 127 | 3 parts by weight |

Used compounds are shown below.

Perfluoro-olefin copolymer

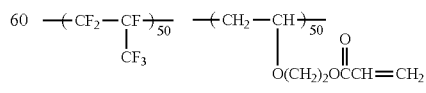

M.W. 50000

In the above structural formula, 50:50 represents a molar ratio.

Fluorine-containing monomer (M-1)

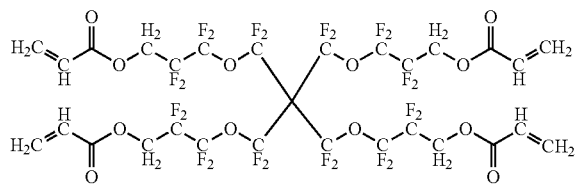 [SMILES: C=CC(=O)OCC(F)(F)C(F)(F)OC(F)(F)C(C(F)(F)OC(F)(F)C(F)(F)COC(=O)C=C)(C(F)(F)OC(F)(F)C(F)(F)COC(=O)C=C)C(F)(F)OC(F)(F)C(F)(F)COC(=O)C=C]

DPHA: Mixture of dipentaerythritol pentaacrylate and dipentaerythritol hexaalkylate; manufactured by Nippon Kayaku RMS-033: silicone series poly-functional acrylate; manufactured by Gelest; Mw=28000)

OPTOOL DAC: fluorine-containing curable compound (manufactured by Daikin Industries)

d-4: illustrative compound (d-4) of the fluorine-containing compound of the general formula (F-4)

Irgacure 127: Photo polymerization initiator; manufactured by CIBA Japan

Hollow silica: Dispersion of hollow silica particles (average particle size: 45 nm; refractive index: 1.25; surface-treated with an acryloyl group-containing silane coupling agent; concentration of MEK dispersion: 20%)

MEK-ST: MEK dispersion of silica of 12 nm in average particle size (30%) [manufactured by Nissan Chemical Industries, Ltd.]

MEK: Methyl ethyl ketone

MMPG-Ac: Propylene glycol monomethyl ether acetate

Each of the above-described coating liquids for forming a low refractive index layer was filtered through a polypropylene-made filter of 1 μm in pore size to prepare coating liquids. The refractive index of each of the cured low refractive index layers formed by coating and curing the above-described coating liquids was 1.34 for Ln-1 to Ln-3 and Ln-6, 1.36 for Ln-4, and 1.50 for Ln-5.

(Preparation of Coating liquid OC-1 for Forming an Overcoat Layer)

The following components were mixed as shown below, and the resulting mixture was dissolved in MEK to prepare a coating liquid for an overcoat layer containing 25% by weight of solid component.

(Formulation of OC-1)

| DPHA | 92 parts by weight |
|---|---|
| OPTOOL DAC | 5 parts by weight |
| Irgacure 127 | 3 parts by weight |

The above-described coating liquid for an overcoat layer was passed through a polypropylene-made filter of 1 μm in pore size to prepare a coating liquid. The refractive index of the overcoat layer formed by curing the above-described coating liquid was 1.52.

[Preparation of Optical Film Sample]

(Preparation of Optical Film Sample 101)

The coating liquid HC-1 for forming the hard coat layer was coated on the side of the support of the optical substrate F1, produced above and unwound from a roll form, according to the die coating method described in Example 1 of JP-A-2006-122889 using a slot die with a conveying speed of 30 m/min, said side not being provided with the optically anisotropic layer. After drying at 60° C. for 150 seconds, the coated layer was cured by irradiating with UV rays with an irradiance of 400 mW/cm$^2$ and an irradiation amount of 300 mJ/cm$^2$ using a 160-W/cm, air-cooled metal halide lamp (manufactured by EYE GRAPHICS CO., LTD.), while purging the system with nitrogen to provide an atmosphere having an oxygen concentration of about 0.1%, and the cured optical film was wound up. The coating amount was adjusted so that the thickness of the hard coat layer became 14 μm.

(Preparation of Optical Film Sample 108)

The coating liquid HC-1 for forming the hard coat layer was coated on the side of the support of the optical substrate F1, produced above and unwound from a roll form, according to the die coating method described in Example 1 of JP-A-2006-122889 using a slot die with a conveying speed of 30 m/min, said side not being provided with the optically anisotropic layer. After drying at 60° C. for 150 seconds, the coated layer was cured by irradiating with UV rays with an irradiance of 400 mW/cm$^2$ and an irradiation amount of 100 mJ/cm$^2$ using a 160-W/cm, air-cooled metal halide lamp (manufactured by EYE GRAPHICS CO., LTD.), while purging the system with nitrogen to provide an atmosphere having an oxygen concentration of about 0.1%, and the cured optical film was wound up. The coating amount was adjusted so that the thickness of the hard coat layer became 14 μm.

The coating liquid Ln-1 for forming the low refractive index layer was coated on this hard coat layer. The drying conditions for the low refractive index layer were 60° C. and 60 seconds, and the UV curing is conducted under the conditions of an irradiance of 600 mW/cm$^2$ and an irradiation amount of 300 mJ/cm$^2$ using a 240-W/cm, air-cooled metal halide lamp (manufactured by EYE GRAPHICS CO., LTD.), while purging the system with nitrogen to provide an atmosphere having an oxygen concentration of 0.1% by volume or less. The refractive index of the low refractive index layer was 1.34, and the thickness thereof was 95 nm Thus, an optical film 108 wherein the hard coat layer and the low refractive layer were formed in this order is prepared.

(Preparation of Optical Film Sample 116)

The coating liquid HC-4 for forming the hard coat layer was coated on the side of the support of the optical substrate F1, produced above and unwound from a roll form, according to the die coating method described in Example 1 of JP-A-2006-122889 using a slot die with a conveying speed of 30 m/min, said side not being provided with the optically anisotropic layer. After drying at 60° C. for 150 seconds, the coated layer was cured by irradiating with UV rays with an irradiance of 400 mW/cm$^2$ and an irradiation amount of 100 mJ/cm$^2$ using a 160-W/cm, air-cooled metal halide lamp (manufactured by EYE GRAPHICS CO., LTD.), while purging the system with nitrogen to provide an atmosphere having an oxygen concentration of about 0.1%, and the cured optical film was wound up. The coating amount of the hard coat layer was adjusted so that the thickness of the hard coat layer became 14 μm.

The above-described coating liquid OC-1 for the overcoat layer was coated on this hard coat layer. The drying conditions for the overcoat layer were 60° C. and 150 seconds, and the UV curing was conducted under the conditions of an irradiance of 400 mW/cm$^2$ and an irradiation amount of 300 mJ/cm$^2$ using a 160-W/cm, air-cooled metal halide lamp (manufactured by EYE GRAPHICS CO., LTD.), while purging the system with nitrogen to provide an atmosphere having an oxygen concentration of about 0.1%. The optical film having the cured layer was wound up. The coating amount was adjusted so that the thickness of the overcoat layer became 1 μm. The refractive index of the overcoat layer was 1.51.

(Preparation of Optical Film Sample 117)

The coating liquid HC-1 for forming the hard coat layer was coated on the side of the support of the optical substrate F1, produced above and unwound from a roll form, according to the die coating method described in Example 1 of JP-A-2006-122889 using a slot die with a conveying speed of 30 m/min, said side not being provided with the optically anisotropic layer. After drying at 60° C. for 150 seconds, the coated layer was cured by irradiating with UV rays with an irradiance of 400 mW/cm$^2$ and an irradiation amount of 100 mJ/cm$^2$ using a 160-W/cm, air-cooled metal halide lamp (manufactured by EYE GRAPHICS CO., LTD.), while purging the system with nitrogen to provide an atmosphere having an oxygen concentration of about 0.1%, and the cured optical film was wound up. The coating amount of the hard coat layer was adjusted so that the thickness of the hard coat layer became 11 μm.

The above-described coating liquid Mn-1 for the medium refractive index layer was coated on this hard coat layer. The drying conditions for the overcoat layer were 90° C. and 30 seconds, and the UV curing was conducted under the conditions of an irradiance of 300 mW/cm$^2$ and an irradiation amount of 240 mJ/cm$^2$ using a 180-W/cm, air-cooled metal halide lamp (manufactured by EYE GRAPHICS CO., LTD.), while purging the system with nitrogen to provide an atmosphere having an oxygen concentration of 1.0% by volume or less. The refractive index of the medium refractive index layer was 1.62, and the thickness thereof was 60 nm.

Successively, the above-described coating liquid Hn-1 for forming the high refractive index layer was coated on the thus-formed medium refractive index layer. The drying conditions for the overcoat layer were 90° C. and 30 seconds, and the UV curing was conducted under the conditions of an irradiance of 300 mW/cm$^2$ and an irradiation amount of 240 mJ/cm$^2$ using a 240-W/cm, air-cooled metal halide lamp (manufactured by EYE GRAPHICS CO., LTD.), while purging the system with nitrogen to provide an atmosphere having an oxygen concentration of 1.0% by volume or less. The refractive index of the high refractive index layer was 1.72, and the thickness thereof was 110 nm Successively, the above-described coating liquid Ln-1 for forming the low refractive index layer was coated on the thus-formed high refractive index layer. The drying conditions for the overcoat layer were 60° C. and 60 seconds, and the UV curing was conducted under the conditions of an irradiance of 600 mW/cm$^2$ and an irradiation amount of 300 mJ/cm$^2$ using a 240-W/cm, air-cooled metal halide lamp (manufactured by EYE GRAPHICS CO., LTD.), while purging the system with nitrogen to provide an atmosphere having an oxygen concentration of 0.1% by volume or less. The refractive index of the low refractive index layer was 1.34, and the thickness thereof was 95 nm.

As is described above, an optical film 117 was prepared wherein the hard coat layer, the medium refractive index layer, the high refractive index layer, and the low refractive index layer were formed in this order.

On each of the optical substrate (transparent support having provided thereon the optically anisotropic layer) prepared above were coated the hard coat layer and other constituent layer according to the combinations shown in Table 2 to thereby prepare the optical film samples No.101 to No. 111 and No. 113 to No.132. Thickness and curing condition for each layer were selected according to those with the similar layer structures of the above-described samples 101, 108, 116 and 117 when not particularly described in the table.

In Table 2, use of the optically anisotropic layer B together with the transparent support T1 means use of the optical substrate F1 manufactured by the foregoing method. In similar, use of the optically anisotropic layer C together with the transparent support T2 means use of the optical substrate F2; use of the optically anisotropic layer B together with the transparent support T3 means use of the optical substrate F3; and use of the optically anisotropic layer B together with the transparent support T4 means use of the optical substrate T4.

TABLE 2

| | Optical Film Structure | | | |
|---|---|---|---|---|
| Optical Film No. | Optically Anisotropic Layer | Transparent Support | Hard Coat Layer | Further Layer(s) |
| 101 | B | T1 | HC-1 (14 μm) | — |
| 102 | B | T1 | HC-2 (11 μm) | — |
| 103 | B | T1 | HC-3 (14 μm) | — |
| 104 | B | T1 | HC-4 (6 μm) | — |
| 105 | B | T1 | HC-5 (14 μm) | — |
| 106 | B | T1 | HC-6 (14 μm) | — |
| 107 | B | T1 | HC-7 (14 μm) | — |
| 108 | B | T1 | HC-1 (14 μm) | Ln-1 |
| 109 | B | T1 | HC-2 (11 μm) | Ln-1 |
| 110 | B | T1 | HC-3 (14 μm) | Ln-1 |
| 111 | B | T1 | HC-4 (6 μm) | Ln-1 |
| 113 | B | T1 | HC-6 (14 μm) | Ln-1 |
| 114 | B | T1 | HC-1 (14 μm) | Ln-2 |
| 115 | B | T1 | HC-1 (14 μm) | Ln-3 |
| 116 | B | T1 | HC-4 (14 μm) | OC-1 |
| 117 | B | T1 | HC-2 (11 μm) | Mn/Hn/Ln-1 |
| 118 | B | T1 | HC-2 (11 μm) | Mn/Hn/Ln-2 |
| 119 | B | T1 | HC-2 (11 μm) | Ln-4 |
| 120 | B | T1 | HC-2 (11 μm) | Ln-5 |
| 121 | B | T1 | HC-2 (11 μm) | Ln-6 |
| 122 | C | T2 | HC-1 (14 μm) | Ln-1 |
| 123 | C | T2 | HC-2 (11 μm) | Ln-1 |
| 124 | C | T2 | HC-2 (11 μm) | Mn/Hn/Ln-2 |
| 125 | B | T3 | HC-1 (14 μm) | Ln-1 |
| 126 | B | T3 | HC-2 (11 μm) | Ln-1 |
| 127 | B | T3 | HC-2 (11 μm) | Mn/Hn/Ln-2 |
| 128 | — | T1 | HC-6 (14 μm) | — |
| 129 | B | T1 | — | — |
| 130 | C | T4 | HC-1 (14 μm) | |
| 131 | C | T4 | HC-1 (14 μm) | Ln-3 |
| 132 | C | T4 | HC-2 (11 μm) | Mn/Hn/Ln-2 |

The fluorine-containing compounds or silicone series compounds included in the hard coat layer, the low refractive index layer, and the over coat layer have a polymerizable group and form covalent bond to the binder of the each layer.

The Re value and Nz value of the optical film after forming the hard coat layer or an optical interference layer did not change from those of the optical substrate.

Various properties of the optical films were measured according to the following methods.

(1) Surface Profile of Optical Films

The following properties of the surface of each of the optical film on the hard coat layer side are measured according to JIS B 0601:1998.

Ra: arithmetic average roughness in roughness curve

Rz: ten point average roughness in roughness curve

Sm: spacing between peaks in roughness curve (2) Haze

The haze (H), internal haze (Hi), and surface haze (Hs) of each of the obtained film were measured by the following measurements.

1. The haze value (H) of the obtained film was measured according to JIS-K7136. This value was referred to as a total haze.
2. A few drops of silicone oil was added on the front surface of the film on the side of the hard coat layer of the obtained film and on the back surface thereof; the film was sandwiched by two sheets of a glass plate having a thickness of 1 mm (MICRO SLIDE GLASS Product No. S9111, manufactured by MATSUNAMI) from the front and back sides, thereby bringing the film into complete intimate contact with the two glass plates; a haze was measured in a state of eliminating a surface haze; and a value obtained by subtracting a haze as separately measured by putting only silicone oil between two sheets of a glass plate therefrom was calculated as an internal haze (Hi).

3. A value obtained by subtracting the internal haze (Hi) from the total haze (H) as measured above in 2. was referred to as a surface haze (Hs).

(3) Average Reflectance (Integral Sphere Reflectance)

The back side of each optical film, i.e., the surface on which the hard coat layer is not coated, was roughened with sand paper, and then treated with a black ink to remove reflection on the back side. In this state, spectral reflectance on the surface side was measured in the wavelength region of from 380 to 780 nm using a spectrophotometer (manufactured by JASCO Corporation). As the results, arithmetic average values of the integral sphere reflectance in the range of from 450 to 650 nm were used.

(4) Pencil Hardness

Evaluation of pencil hardness described in JIS K 5400 is conducted, and the hard coat layer-coated side was evaluated according to the following criteria:

AA: 4H or more;
A: 3H
B: less than 2H (5) Surface Free Energy

The surface free energy of the topmost surface on the hard coat layer side of the optical film and that of the topmost surface on the optically anisotrpoic layer side were calculated according to the aforesaid method by measuring contact angles with water and methylene iodide.

(Evaluation of Optical Film in a Roll Form)

In order to evaluate storage stability with time of each of the above-prepared optical films, each optical film was wound up with a width of 300 mm and a length of 50 m. After storing the optical film roll for 1 week at 40° C. and 50% in relative humidity, it was subjected to evaluation. Each of the optical film rolls stored as described above was visually observed, and ranked according to the following criteria:

AA: No particular changes in appearance are observed.

A: Change in appearance is observed after storage in a roll form, and unevenness of reflected light is observed when viewed as a roll but, when unwound and viewed in a sheet form, unevenness of reflected light due to storage with time cannot be confirmed.

B: Change in appearance is observed after storage in a roll form, and unevenness of reflected light is observed when viewed as a roll and, when unwound and viewed in a sheet form, unevenness of reflected light due to storage with time is still observed. This unevenness can be removed by wiping the surface of the optical film once with unwoven fabric.

C: Change in appearance is observed after storage in a roll form, and unevenness of reflected light is observed when viewed as a roll and, when unwound and viewed in a sheet form, unevenness of reflected light due to storage with time is still observed. It is difficult to remove this unevenness by wiping the surface of the optical film with unwoven fabric.

[Preparation of Polarizing Plate and Image Display Device]

In order to evaluate as an image display device, each of the above-prepared optical films was processed in the following manner to form a polarizing plate, and was evaluated as an image display device.

The optically anisotropic layer surface of each of the above-prepared optical film was washed with MEK. The washed film surface was subjected to alkali saponification treatment. They were dipped in a 1.5N sodium hydroxide aqueous solution at 55° C. for 2 minutes, then washed in a water bath of room temperature, followed by neutralizing with 0.1 N sulfuric acid at 30° C. Again, the films were washed in a water bath of room temperature, and were dried with a 100° C. hot air.

Successively, a 80-μm thick roll-form polyvinyl alcohol film was continuously stretched to a draw ratio of 5 in an iodine aqueous solution, and dried to obtain a 20 μm thick polarizing film. The above-described alkali saponification-treated films and a similarly alkali saponification-treated retardation film for VA (manufactured by FUJIFILM Corporation; Re/Rth at 550 nm=50/125) were prepared, and the polarizing film was sandwiched by lamination between the two films using a 3% aqueous solution of polyvinyl alcohol (manufactured by KURARAY CO. LTD.; PVA-117H) as an adhesive, with the saponification-treated surface of each film facing the polarizing film. Thus, there were prepared polarizing plates 101 to 111 and 113 to 132 wherein the optical film and the retardation film for VA function as protective films. In this occasion, the angle between the slow axis of the optical film and the transmission axis of the polarizer was adjusted to be 45°.

(Mounting)

TV: A polarizing plate on the viewing side of a TV (UN46C7000 (3D-TV) manufactured by SAMSUNG) was delaminated, and the retardation film for VA of the above-prepared olarizing plate was laminated on the LC cell through an adhesive to thereby prepare a three-dimensional display device.

LC shutter spectacles: A polarizing plate of LC shutter spectacles SSG-2100AB (LC shutter spectacles) manufactured by SAMSUNG and formed on the opposite side to the eye (panel side) was delaminated, and the above-described optical film sample 118 was laminated thereon using an adhesive, with the optically anisotropic layer side of the optical film facing the delaminated surface. Thus, LC shutter spectacles were prepared. The slow axis of the optical film laminated on the spectacles was adjusted to meet at right angles with the slow axis of the optical film contained in the polarizing plate laminated on the TV.

(Evaluation of Display Device)

A 3D image was appreciated with wearing the above-prepared LC shutter spectacles in a room equipped with a fluorescent lamp under the condition that illuminance on the panel surface was about 200 1x.

Evaluation of the image was conducted by functional evaluation of three-dimensionality and crosstalk of the 3D image according to the following criteria:

[Three Dimensionality of 3D Image]

Functional evaluation was conducted in the following 5 grades: three dimensionality of TV having laminated thereon the optical film 129 (film not having formed thereon any hard coat layer) was scored 3; three dimensionality which was the most deteriorated among all TVs was scored 1; three dimensionality which is the most excellent was scored 5. An average score of 5 evaluators was taken as an indicator of three dimensionality.

[Crosstalk]

Crosstalk (double images) was observed by viewing a sample with inclining the head or by viewing in the inclined direction, and a sample with which crosstalk is annoying was ranked A, and a sample with which crosstalk is scarcely annoying was ranked B. Evaluation of crosstalk was conducted according to the above-described criteria.

Evaluation results with respect to the above-described items are shown in Table 3.

TABLE 3

| Optical Film No. | Ra (μm) | Rz (μm) | Sm (μm) | Surface Haze | Internal Haze | Total Haze | Integral Reflectance (%) | Elc (Optically Anisotropic Layer) | Ehc (HC Layer Side) | Note | Unevenness with time in Roll Form | Pencil Hardness | Three Dimensionality of 3D Image | Crosstalk |
|---|---|---|---|---|---|---|---|---|---|---|---|---|---|---|
| 101 | 0.12 | 0.80 | 70 | 1.5 | 7.5 | 9 | 4.1% | 23 | 30 | Comparison | B | AA | 2.8 | A |
| 102 | 0.07 | 0.43 | 57 | 1.0 | 0.3 | 1.3 | 4.1% | 23 | 30 | Comparison | B | AA | 3 | A |
| 103 | 0.15 | 1.2 | 80 | 4 | 22 | 26 | 4.1% | 23 | 30 | Comparison | B | AA | 2.6 | A |
| 104 | 0.35 | 3.2 | 45 | 33 | 3 | 36 | 4.1% | 23 | 30 | Comparison | B | C | 1.2 | A |
| 105 | 0.18 | 1.2 | 80 | 5 | 34 | 39 | 4.1% | 23 | 30 | Comparison | B | AA | 1.2 | A |
| 106 | 0.04 | 0.22 | 330 | less than 0.1 | less than 0.1 | less than 0.1 | 4.1% | 23 | 30 | Comparison | C | AA | 3 | A |
| 107 | 0.06 | 0.41 | 54 | 0.9 | 0.3 | 1.2 | 4.1% | 23 | 18 | Invention | A | AA | 3 | A |
| 108 | 0.12 | 0.70 | 70 | 1.1 | 7.5 | 8.6 | 1.0% | 23 | 22 | Invention | A | AA | 3.8 | A |
| 109 | 0.06 | 0.41 | 57 | 0.9 | 0.3 | 1.2 | 1.0% | 23 | 22 | Invention | A | AA | 4.2 | A |
| 110 | 0.15 | 1.2 | 80 | 4 | 22 | 26 | 1.0% | 23 | 22 | Invention | A | AA | 3.4 | A |
| 111 | 0.35 | 3.2 | 45 | 33 | 3 | 36 | 1.2% | 23 | 22 | Comparison | A | C | 3 | A |
| 113 | 0.04 | 0.22 | 330 | less than 0.1 | less than 0.1 | less than 0.1 | 1.0% | 23 | 22 | Comparison | B | AA | 4.2 | A |
| 114 | 0.12 | 0.70 | 70 | 1.1 | 7.5 | 8.6 | 1.0% | 23 | 18 | Invention | AA | AA | 3.8 | A |
| 115 | 0.12 | 0.70 | 70 | 1.1 | 7.5 | 8.6 | 1.0% | 23 | 16 | Invention | AA | AA | 3.8 | A |
| 116 | 0.15 | 1.6 | 55 | 6 | 3 | 9 | 4.1% | 23 | 18 | Invention | A | AA | 2.8 | A |
| 117 | 0.06 | 0.41 | 57 | 0.9 | 0.3 | 1.2 | 0.4% | 23 | 22 | Invention | A | AA | 5 | A |
| 118 | 0.06 | 0.41 | 57 | 0.9 | 0.3 | 1.2 | 0.4% | 23 | 18 | Invention | AA | AA | 5 | A |
| 119 | 0.06 | 0.41 | 57 | 0.9 | 0.3 | 1.2 | 1.3% | 23 | 22 | Invention | A | AA | 4 | A |
| 120 | 0.06 | 0.41 | 57 | 0.9 | 0.3 | 1.2 | 4.0% | 23 | 22 | Invention | A | AA | 3 | A |
| 121 | 0.06 | 0.41 | 57 | 0.9 | 0.3 | 1.2 | 1.0% | 23 | 25 | Invention | A | AA | 4.2 | A |
| 122 | 0.12 | 0.70 | 70 | 1.1 | 7.5 | 8.6 | 1.0% | 23 | 22 | Invention | A | AA | 3.8 | A |
| 123 | 0.06 | 0.41 | 57 | 0.9 | 0.3 | 1.2 | 1.0% | 23 | 22 | Invention | A | AA | 4.2 | A |
| 124 | 0.06 | 0.41 | 57 | 0.9 | 0.3 | 1.2 | 0.4% | 23 | 18 | Invention | AA | AA | 5 | A |
| 125 | 0.12 | 0.70 | 70 | 1.1 | 7.5 | 8.6 | 1.0% | 23 | 22 | Invention | A | AA | 3.8 | A |
| 126 | 0.06 | 0.41 | 57 | 0.9 | 0.3 | 1.2 | 1.0% | 23 | 22 | Invention | A | AA | 4.2 | A |
| 127 | 0.06 | 0.41 | 57 | 0.9 | 0.3 | 1.2 | 0.4% | 23 | 18 | Invention | AA | AA | 5 | A |
| 128 | 0.04 | 0.22 | 330 | less than 0.1 | less than 0.1 | less than 0.1 | 4.1% | — | 30 | Comparison | AA | AA | 3 | B |
| 129 | — | — | — | — | — | — | 4.0% | 23 | — | Comparison | AA | C | 3 | A |
| 130 | 0.12 | 0.80 | 70 | 1.5 | 7.5 | 9.0 | 4.1% | 23 | 30 | Comparison | B | AA | 5 | A |
| 131 | 0.12 | 0.70 | 70 | 1.1 | 7.5 | 8.6 | 1.0% | | | | | | | |
| 132 | 0.06 | 0.41 | 57 | 0.9 | 0.3 | 1.2 | 0.4% | | | | | | | |

TABLE 3-continued

| 131 | 23 | 16 | Invention | AA | AA | 5 | A |
| 132 | 23 | 18 | Invention | AA | AA | 5 | A |

As is shown in Table 3, it is seen that, by controlling the profile of the surface of the optical film on the hard coat layer side to the profile of the present application, there can be provided an optical film undergoing no change in appearance with time in a roll form and not spoiling expected optical anisotropy.

[Preparation 2 of Image Display Device]

A polarizing plate where the optical film 117 and the optical substrate F1 functioned as a protective film of a polarizing layer was manufactured in the same manner as in the method for manufacturing the above-described polarizing plate expect for using the optical substrate F1 in which the surface of the cellulose acetate film included was subjected to a saponification treatment instead of using the retardation film for VA. The resulting polarizing plate was provided at a surface of an organic electroluminescence device thorough an adhesive so that the low refractive index layer of the optical film 117 was provided at the outermost side. Excellent anti-reflection properties were obtained, no scratching and no color unevenness were found, and good display performance was obtained. Additionally, by wearing a polarized sunglass, it can be suppressed luminance deterioration caused by inclining a face and rotating a display.

Industrial Applicability

According to the present invention, there can be provided an optical film suppresses generation of unevenness after storage in a roll form and which has excellent physical properties. Further, the optical film of the invention can provide an optical film which can be used on the surface of an image display device with keeping adequate antiglare properties and without losing functions as an optically anisotropic film.

This application is based on Japanese patent application No. 2010-232030 filed on Oct. 14, 2010, the entire content of which is hereby incorporated by reference, the same as if set forth at length.

The invention claimed is:

1. An optical film comprising:
 a hard coat layer;
 an optically anisotropic layer; and
 a transparent support,
 wherein the optically anisotropic layer contains a liquid crystalline compound and a binder,
 the hard coat layer, the transparent support, and the optically anisotropic layer are laminated in this order by a roll to roll process,
 a surface of the optically anisotropic layer contains a fluorine-containing compound not forming any covalent bond with the binder of the optically anisotropic layer,
 a topmost surface of the optical film on the hard coat layer-formed side contains a fluorine- containing or silicone series compound being fixed by covalent bonding to the surface,
 the topmost surface properties of the optical film on the hard coat layer-formed side satisfy the following conditions:
 (1) Ra is 0.05 to 0.25 μm;
 (2) Rz is 0.4 to 3.0 μm;
 (3) Sm is 40 to 200 μm;
 (4) surface haze is 0.1 to 15;
 (5) internal haze is 0 to 28; and
 (6) total haze is 0.1 to 30;
 wherein Ra, Rz, and Sm represent, respectively, an arithmetic average roughness in a roughness curve profile of the topmost surface of the hard coat layer-formed side of the optical film, a ten point average roughness in the roughness curve, and a spacing between peaks in the roughness curve,
 wherein the optical film is wound up in a roll form,
 wherein the optically anisotropic layer containing a liquid crystalline compound is provided, directly or through an alignment layer, at one side of the transparent support and the hard coat layer is provided directly on the other side of the transparent support,
 and wherein a surface free energy of the optically anisotropic layer (Elc) and a surface free energy of the topmost surface of the optical film on the hard coat layer-formed side (Ehc) have a relationship of Ehc-Elc≤0.

2. The optical film according to claim 1,
 wherein the surface free energy of the optically anisotropic layer (Elc) is from 21 to 30 mN/m, and the surface free energy of the topmost surface of the optical film on the hard coat layer-formed side (Ehc) is from 14 to 24 mN/m.

3. The optical film according to claim 1,
 wherein other functional layer than the hard coat layer is formed on the surface of the hard coat layer.

4. The optical film according to claim 1,
 wherein the topmost surface physical properties on the hard coat layer-formed side
 further satisfy the following conditions:
 (4) surface haze is 0.1 to 10;
 (5) internal haze is 0 to 10; and
 (6) total haze is 0.1 to 15.

5. The optical film according to claim 1,
 wherein the topmost surface physical properties on the hard coat layer-formed side
 further satisfy the following conditions:
 (4) surface haze is 0.1 to 8;
 (5) internal haze is 0 to 5; and
 (6) total haze is 0.1 to 10.

6. The optical film according to claim 1,
 wherein the hard coat layer contains a binder and light-transmitting particles,
 a size of the light-transmitting particles is from 1 to 12 μm, and
 an absolute value of difference in refractive index between the binder and the light-transmitting particles is less than 0.05.

7. The optical film according to claim 1,
 wherein the hard coat layer contains a binder and light-transmitting particles,
 a size of the light-transmitting particles being from 3 to 12 μm, and
 an absolute value of the difference in refractive index between the binder and the light-transmitting particles is from 0.001 to 0.02.

8. The optical film according to claim 1,
 wherein in-plane retardation Re of the optical film at 550 nm is from 80 to 200 nm, and Nz value of the optical film represented by the following formula is from 0.1 to 0.9:

$$Nz\ value = 0.5 + Rth/Re$$

wherein Rth represents retardation in thickness direction.

9. A polarizing plate comprising the optical film according to claim 1 as a protective film.

10. An image display device containing at least one of the polarizing plates according to claim 9.

11. An image display device containing at least one of the optical films according to claim 1.

* * * * *